United States Patent
Hao et al.

(10) Patent No.: US 8,493,134 B2
(45) Date of Patent: Jul. 23, 2013

(54) METHOD AND APPARATUS TO PROVIDE A CLOCK SIGNAL TO A CHARGE PUMP

(75) Inventors: Wuyang Hao, San Diego, CA (US); Jung Pill Kim, San Diego, CA (US); Jungwon Suh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 714 days.

(21) Appl. No.: 12/729,281

(22) Filed: Mar. 23, 2010

(65) Prior Publication Data

US 2011/0238203 A1   Sep. 29, 2011

(51) Int. Cl.
*G05F 1/10* (2006.01)

(52) U.S. Cl.
USPC ......................................................... 327/536

(58) Field of Classification Search
USPC .................................. 327/535, 536, 537
See application file for complete search history.

(56) References Cited

U.S. PATENT DOCUMENTS

| | | | | |
|---|---|---|---|---|
| 5,191,232 | A * | 3/1993 | Wang | 327/306 |
| 5,302,920 | A | 4/1994 | Bitting | |
| 5,953,386 | A | 9/1999 | Anderson | |
| 6,208,198 | B1 | 3/2001 | Lee | |
| 6,429,632 | B1 | 8/2002 | Forbes et al. | |
| 6,597,235 | B2 | 7/2003 | Choi | |
| 7,173,478 | B2 * | 2/2007 | Chun | 327/536 |
| 7,439,794 | B2 * | 10/2008 | Takeyama et al. | 327/536 |
| 7,786,791 | B2 * | 8/2010 | Park | 327/536 |
| 2006/0220728 | A1 | 10/2006 | Chun | |
| 2008/0054990 | A1 | 3/2008 | Shieh et al. | |
| 2010/0052771 | A1 | 3/2010 | Hartono | |

OTHER PUBLICATIONS

Han J., et al.,"A New Approach to Reducing Output Ripple in Switched-Capacitor-based Step-down DC-DC Converters", Industry Applications Conference, 2004. 39th as Annual Meeting. Conference Record of the 2004 IEEE Seattle, WA, USA Oct. 3-7, 2004, Piscataway, NJ, USA,IEEE, vol. 2, Oct. 3, 2004, pp. 1115-1120, XP010734543.

International Search Report and Written Opinion—PCT/US2011/029481, ISA/EPO—Sep. 27, 2012.

Lee S C., et al., "A Low-Ripple Switched-Capacitor Dc-Dc Up Converter for Low-Voltage Applications", IEICE Transactions on Electronics, Institute of Electronics, Tokyo, JP, vol. E84-C, No. 8, Aug. 1, 2001, pp. 1100-1103, XP001107649.

* cited by examiner

*Primary Examiner* — Jeffrey Zweizig
(74) *Attorney, Agent, or Firm* — Sam Talpalatsky; Nicholas J. Pauley; Joseph Agusta

(57) ABSTRACT

A method and apparatus for providing a clock signal to a charge pump is disclosed. In a particular embodiment, the method includes providing a first clock signal to a first charge pump unit of a charge pump. The method further includes providing a second clock signal to a second charge pump unit of the charge pump. A low-to-high transition of the first clock signal occurs substantially concurrently with a high-to-low transition of the second clock signal. Only one clock signal may be at a logic high voltage level at any given time.

44 Claims, 11 Drawing Sheets

METHOD AND APPARATUS TO PROVIDE A CLOCK SIGNAL TO A CHARGE PUMP

I. FIELD

The present disclosure is generally related to a method and an apparatus for providing a clock signal to a charge pump.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Voltage boost circuits are used by electronic circuits to provide components of the circuit with a reference voltage that is higher than the supply voltage applied to the circuit. Voltage boost circuits typically include a charge pump. The charge pump is typically required to provide a stable output voltage and a low output ripple voltage. The ripple voltage on the output of the charge pump is sensitive to variations in the manufacturing process, to temperature, and to the supply voltage. A multiphase clock may be used to reduce the ripple voltage by feeding different phases of the clock to different charge pump units. However, when the multiphase clock is disabled, the charge pump may produce a relatively large output ripple voltage that exceeds a determined tolerance.

III. SUMMARY

A new voltage boost method and circuit is disclosed to reduce the output ripple voltage when the clock signal is disabled. A ring oscillator generates a multiphase clock signal using different taps within the ring oscillator. The various clock signals in the multiphase clock overlap one another. A logic operation is applied to the multiphase clock to produce a new clock having non-overlapping clock outputs. Only one of the clock outputs will be a logic high at any given time while the clock signal is enabled (e.g., a one-hot clock signal). The non-overlapping clock outputs are provided to the charge pump, where each separate clock output signal may be provided to a separate charge pump unit. When the clock signal is disabled as a result of the output voltage exceeding a threshold voltage, only one falling edge transition will occur since only one clock signal output of the non-overlapping clock signals may be high at any given time. A single falling edge transition when the clock is disabled results in a relatively low output ripple voltage.

The voltage boost method and circuit also reduces the size of the capacitors utilized by the charge pump units as a result of a falling and a rising edge occurring substantially concurrently on every transition other than the first transition when the clock is enabled and the final transition when the clock is disabled. Since a big portion of total charge pump is capacitor area this reduction in capacitor size will lead to total area reduction in silicon. In addition to the reduced area advantage, a smaller capacitance further reduces the output ripple voltage when the clock is disabled.

In a particular embodiment, a method includes providing a first clock signal to a first charge pump unit of a charge pump. The method further includes providing a second clock signal to a second charge pump unit of the charge pump. A low-to-high transition of the first clock signal occurs substantially concurrently with a high-to-low transition of the second clock signal. Further, only one clock signal may be at a logic high voltage level at any given time.

In another particular embodiment, the method includes providing a one-hot input clock signal to a charge pump having multiple charge pump units. The one-hot input clock signal includes multiple clock signals comprising a first clock signal provided to a first charge pump unit of the multiple charge pump units and a second clock signal provided to a second charge pump unit of the multiple charge pump units. Further, each transition of the multiple clock signals results in at most one of the multiple clock signals having a logic high voltage level at any time.

In another particular embodiment, an apparatus includes logic circuitry configured to receive a multiphase clock output signal of a ring oscillator. The logic circuitry is configured to generate multiple input clock signals to drive a charge pump having multiple charge pump units. The multiple input clock signals are configured such that each transition of each input clock signal occurs substantially concurrently with another transition of another input clock signal of the multiple input clock signals.

One particular advantage provided by at least one of the disclosed embodiments is that the ripple voltage on the output of the charge pump is reduced. Thus, an enhanced method and circuit for a charge pump having a low output ripple voltage is provided.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
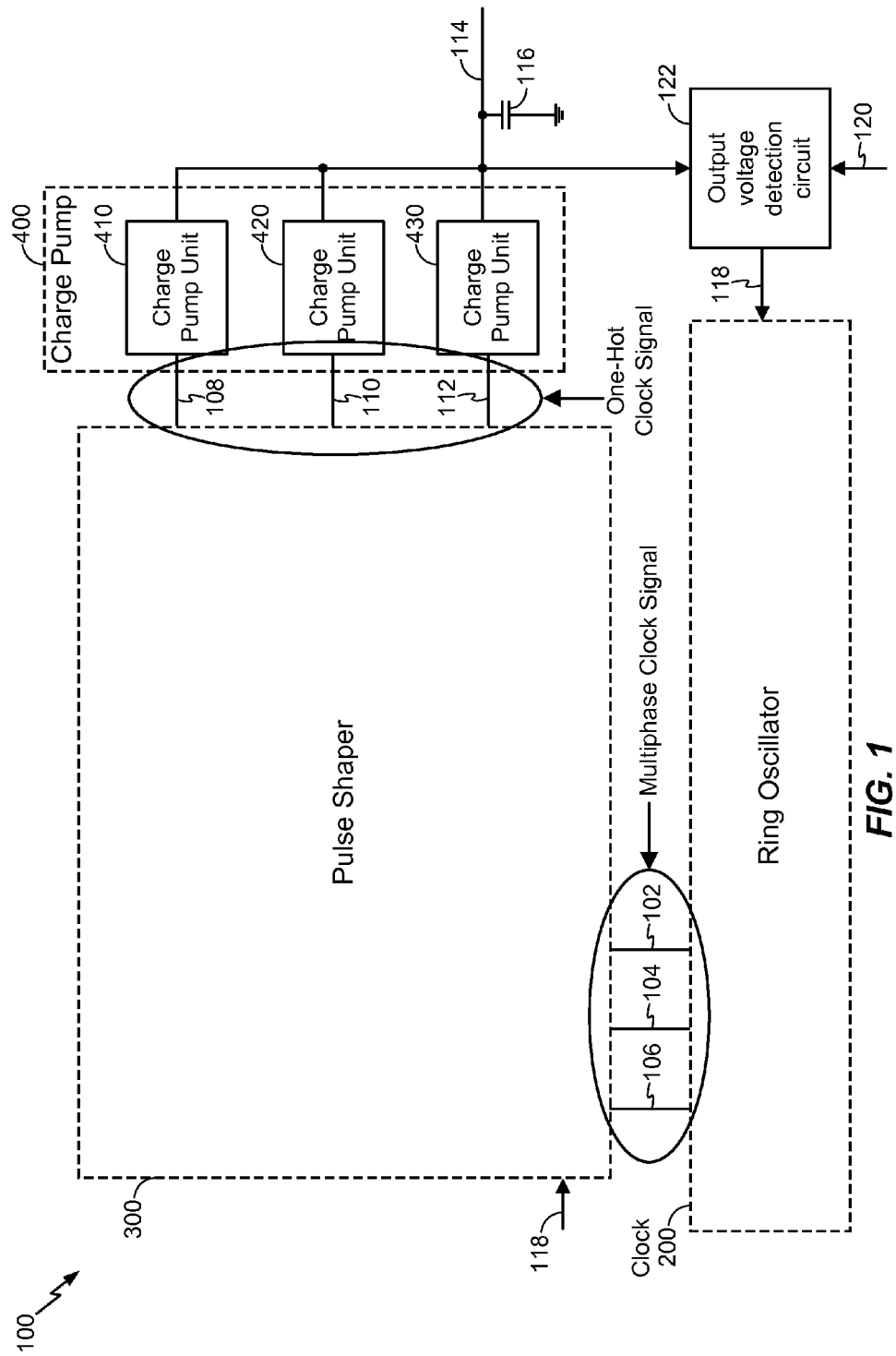
FIG. 1 is a block diagram of a particular illustrative embodiment of a voltage boost circuit.

Referring to FIG. 1, a particular illustrative embodiment of a circuit that includes a voltage boost circuit 100 is illustrated. The voltage boost circuit 100 includes a ring oscillator 200, a pulse shaper 300, a charge pump 400, and an output voltage detection circuit 122. The charge pump 400 includes multiple charge pump units. For example, the charge pump 400 includes a first charge pump unit 410, a second charge pump unit 420, and a third charge pump unit 430. While three charge pump units are shown with respect to FIG. 1, it should be understood that the charge pump 400 may include more or fewer charge pump units than shown.

In a particular illustrative embodiment, the output voltage detection circuit 122 receives a voltage output 114 of the charge pump 400 and receives a reference voltage 120. Based on the voltage output 114 and the reference voltage 120, the output voltage detection circuit 122 provides a control signal 118 to enable or disable the ring oscillator 200 and the pulse shaper 300. For example, the output voltage detection circuit 122 may receive the voltage output 114, divide down the voltage output 114, and compare the divided voltage output to the reference voltage 120 to produce the control signal 118. When the divided voltage output exceeds a first threshold based on the reference voltage 120, the control signal 118 disables the ring oscillator 200 and the pulse shaper 300. When the divided voltage output falls below a second threshold based on the reference voltage 120, the control signal 118 enables the ring oscillator 200 and the pulse shaper 300.

Upon receipt of the control signal 118 enabling the ring oscillator 200, the ring oscillator 200 provides a multiphase clock, including a first clock signal 102, a second clock signal 104, and a third clock signal 106, to the pulse shaper 300. In a particular embodiment, the first clock signal 102, the second clock signal 104, and the third clock signal 106 may comprise a multiphase clock where the first clock signal 102 has a first phase, the second clock signal 104 has a second phase different from the first phase, and the third clock signal 106 has a third phase different from the first and second phase. While three clock signals are shown with respect to FIG. 1, it should be understood that the ring oscillator 200 may provide more or fewer clock signals than shown.

The pulse shaper 300 receives the first clock signal 102, the second clock signal 104, and the third clock signal 106 from the ring oscillator 200. The pulse shaper 300 also receives the control signal 118 from the output voltage detection circuit 122. When the pulse shaper 300 is enabled by the control signal 118, the pulse shaper 300 provides a clock signal to the charge pump 400. In a particular illustrative embodiment, the pulse shaper 300 provides a clock signal to each charge pump unit of the charge pump 400. For example, the pulse shaper 300 may provide a first output clock signal 108 to the first charge pump unit 410, a second output clock signal 110 to the second charge pump unit 420, and a third output clock signal 112 to the third charge pump unit 430. The combination of the first output clock signal 108, the second output clock signal 110, and the third output clock signal 112 may comprise a one-hot clock signal where only one of the output clock signals is at a logic level high at any given time. For example, when the first output clock signal 108 is at a logic level high, the second output clock signal 110, and the third output clock signal 112 are at a logic level low. When the second output clock signal 110 is at a logic level high, the first output clock signal 108 and the third output clock signal 112 are at a logic level low. When the third output clock signal 112 is at a logic level high, the first output clock signal 108 and the second output clock signal 110 are at a logic level low.

In a particular illustrative embodiment, the combination of the first output clock signal 108, the second output clock signal 110, and the third output clock signal 112 comprises a one-hot clock signal where only one of the output clock signals is at a logic level high at any given time. In addition, the transition of one of the output clock signals occurs substantially concurrently with the transition of another output clock signal after a first transition resulting from the enablement of the pulse shaper 300 by the control signal 118. For example, when the first output clock signal 108 transitions from a high logic level to a low logic level, the second output clock signal 110 substantially concurrently transitions from a low logic level to a high logic level. When the second output clock signal 110 transitions from a high logic level to a low logic level, the third output clock signal 112 substantially concurrently transitions from a low logic level to a high logic level. When the third output clock signal 112 transitions from a high logic level to a low logic level, the first output clock signal 108 substantially concurrently transitions from a low logic level to a high logic level.

However, only one transition occurs on the first transition after the pulse shaper 300 is enabled by the control signal 118. For example, in a disabled state, the output clock signals 108, 110, and 112 will all be at a logic low level. When the pulse shaper 300 is enabled by the control signal 118, only one of the output clock signals may transition to a high logic level. Thus, only one transition will occur on the first transition after the pulse shaper 300 is enabled by the control signal 118. While three clock signals are shown with respect to FIG. 1, it should be understood that the pulse shaper 300 may provide more or fewer output clock signals than shown. Furthermore, the multiple output clock signals may be divided into groups such that each group represents a one-hot signal where a first output clock of a first group may be at a logic high level concurrently with a first output clock of a second group.

Each transition of the output clock signals 108, 110, and 112, whether a high-to-low or a low-to-high transition, provides a voltage boost to the voltage output 114. Therefore, apart from the first transition after the pulse shaper 300 is enabled, two of the charge pumps will provide voltage boosts to the output voltage 114 substantially concurrently because two of the clock signals transition substantially concurrently at each transition. For example, both the first charge pump unit 410 and the second charge pump unit 420 provide a voltage boost to the voltage output 114 when the first output clock signal 108 transitions from a high to a low and the second output clock signal 110 substantially concurrently transitions from a low to a high. When the second output clock signal 110 transitions from a high to a low and the third output clock signal 112 substantially concurrently transitions from a low to a high, both the second charge pump unit 420 and the third charge pump unit 430 provide a voltage boost to the voltage output 114. When the third output clock signal 112 transitions from a high to a low and the first output clock signal 108 substantially concurrently transitions from a low to a high, both the third charge pump unit 430 and the first charge pump unit 410 provide a voltage boost to the voltage output 114.

Therefore, two of the charge pump units 410, 420, and 430, substantially concurrently provide voltage boosts that charge an output capacitor 116. The output capacitor 116 maintains a voltage level of the voltage output 114. The voltage output 114 may be used to provide a DC reference voltage to circuit elements requiring a reference voltage at a level higher than an applied supply voltage. The voltage output 114 is also provided to the output voltage detection circuit 122 to monitor the voltage output 114. When the output voltage detection circuit 122 determines that the voltage output 114 is too high, the output voltage detection circuit 122 disables the ring oscillator 200 and the pulse shaper 300. As a result of disabling the ring oscillator 200 and the pulse shaper 300, the output clock signals 108, 110, and 112 are no longer provided to the charge pump 400 and the charge pump 400 ceases to provide voltage boosts to charge the output capacitor 116. When the voltage boosts are no longer provided to the output capacitor 116, the charge on the output capacitor 116 dissipates at a rate faster than the rate that the charge is replenished and the voltage level of the voltage output 114 drops. When the output voltage detection circuit 122 determines that the voltage output 114 has dropped below a certain voltage level, the output voltage detection circuit 122 enables the ring oscillator 200 and the pulse shaper 300. As a result of enabling the ring oscillator 200 and the pulse shaper 300, the output clock signals 108, 110, and 112 are provided to the charge pump 400 and the charge pump 400 provides voltage boosts to charge the output capacitor 116. When the voltage boosts are provided to the output capacitor 116, the charge on the output capacitor 116 is maintained or increases at a rate faster than the rate that the charge can dissipate, and the voltage level of the voltage output 114 is maintained or increases.

Figure 2:
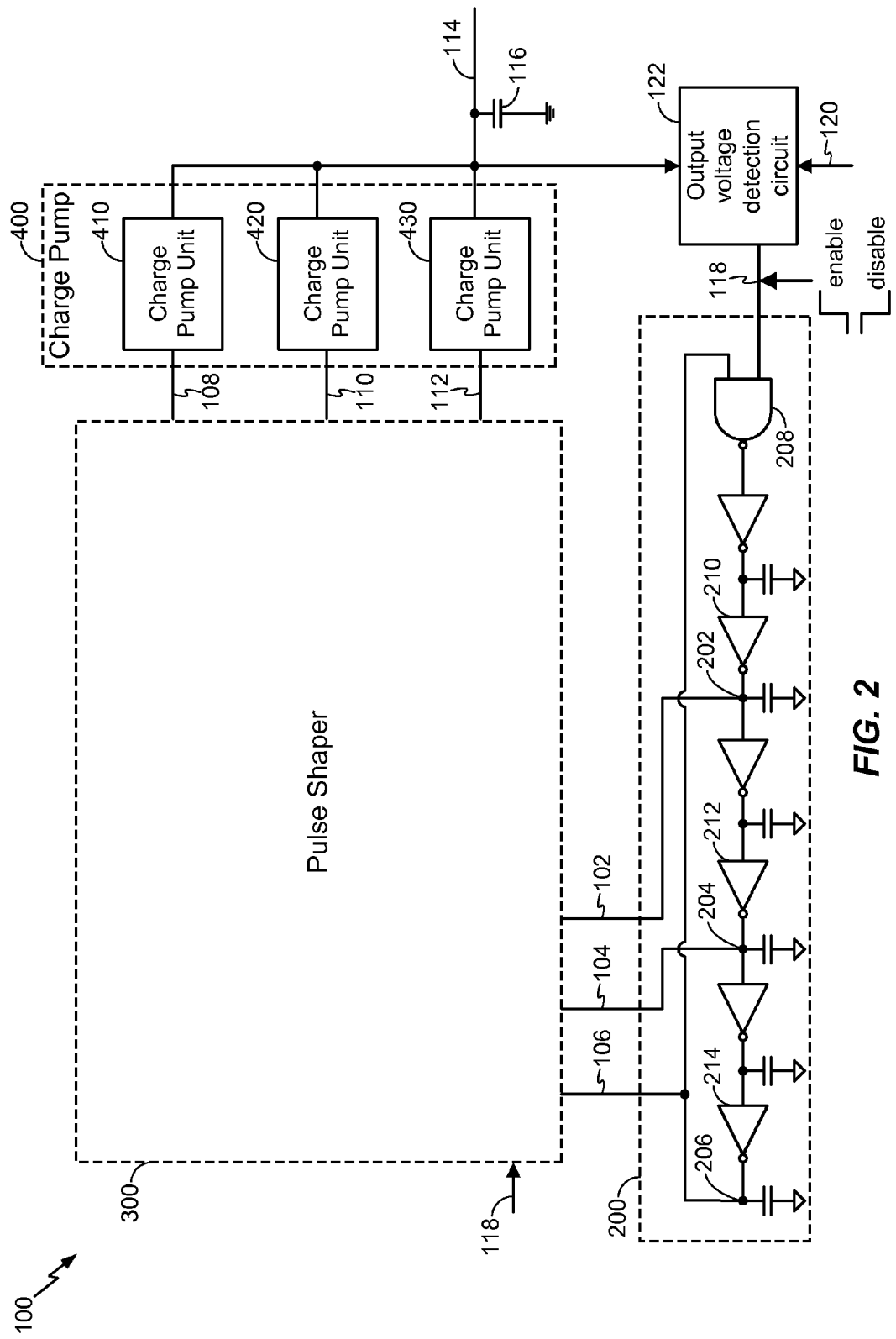
FIG. 2 is a block diagram of a particular illustrative embodiment of a voltage boost circuit.

FIG. 2 illustrates the voltage boost circuit 100 having a particular embodiment of the ring oscillator 200. In a particular illustrative embodiment, the ring oscillator 200 receives the control signal 118 at a NAND gate 208. The control signal 118 enables the ring oscillator 200 when the control signal is a logic high and disables the ring oscillator 200 when the control signal 118 is a logic low. The NAND gate 208 functions as an inverter in the inverter loop when the control signal 118 is a logic high, thereby allowing the ring oscillator 200 to oscillate. When the control signal 118 is a logic low, the NAND gate 208 outputs a logic level high regardless of the logic level of other input to the NAND gate 208, thereby disabling the ring oscillator 200. While the NAND gate 208 for enabling/disabling the ring oscillator 200 is shown with respect to FIG. 2, it should be understood that other configurations for enabling/disabling the ring oscillator 200 may be used.

The ring oscillator 200 may include a chain of multiple inverters where the output of an inverter 214 is provided as an input to the NAND gate 208. The ring oscillator 200 may also provide the first clock signal 102, the second clock signal 104, and the third clock signal 106 to the pulse shaper 300. The first clock signal 102 may be provided by directly tapping a first output node 202 of an inverter 210. The second clock signal 104 may be provided by directly tapping a second output node 204 of an inverter 212. The third clock signal 106 may be provided by directly tapping a third output node 206 of the inverter 214. In the configuration illustrated in FIG. 2, there are two inverters between each tapped output node. Therefore, the second clock signal 104 will be a delayed version of the first clock signal 102, and the third clock signal 106 will be a delayed version of the second clock signal 104. The time delay between each clock signal will approximately equal two inverter gate delays. Each clock signal will have substantially the same period, but will be shifted in time from the other clock signals, thereby providing clock signals at different phases, where the phase of the clock signal represents the time shift with respect to a reference. For example, the first clock signal 102 may serve as a reference and have a phase of 0 degrees. The second clock signal 104 may be delayed with respect to the first clock signal 102 by a time equal to one sixth the clock period resulting in a 60 degree phase shift from the first clock signal 102. Thus the second clock signal 104 will have a phase of 60 degrees with respect to the reference. The third clock signal 106 may be delayed with respect to the second clock signal 104 by a time equal to one sixth the clock period resulting in a 60 degree phase shift from the second clock signal 104. Thus the third clock signal 106 will have a phase of 120 degrees with respect to the reference. Therefore, the first clock signal 102 will have the first phase, the second clock signal 104 will have the second phase, and the third clock signal 106 will have the third phase where the first, second, and third phases correspond to the time delay between each clock signal. In this manner, the ring oscillator 200 may provide a multiphase clock signal to the pulse shaper 300. While two inverters between each output node 202, 204, and 206 are shown with respect to the ring oscillator 200 of FIG. 2, it should be understood that the ring oscillator 200 may provide more or fewer inverters, or other types of delay circuitry, between the output nodes 202, 204, and 206. Further, the ring oscillator 200 may provide more or fewer clock output signals to the pulse shaper 300 than shown in FIG. 2.

Figure 3:
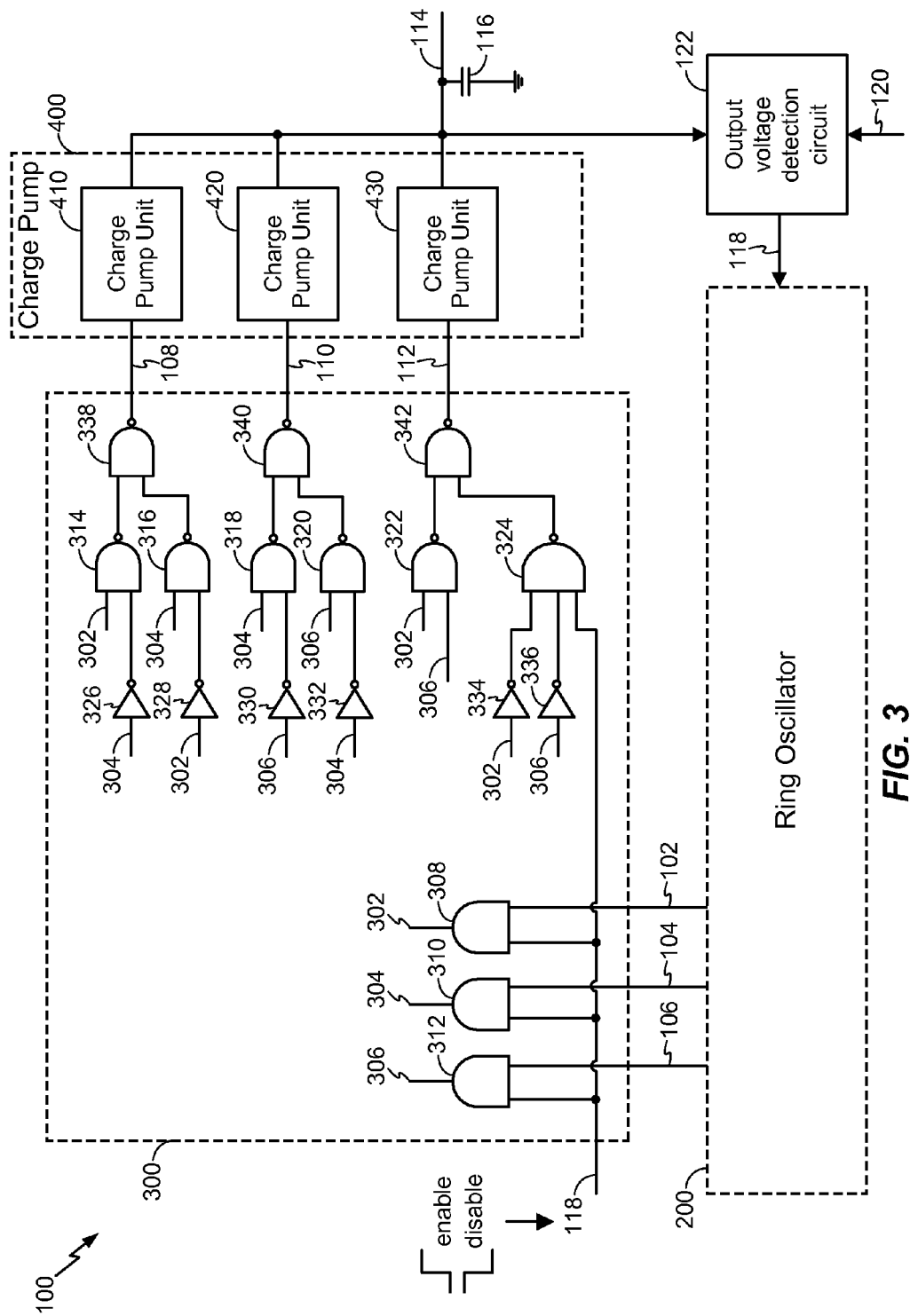
FIG. 3 is a block diagram of a particular illustrative embodiment of a voltage boost circuit.

FIG. 3 illustrates the voltage boost circuit 100 including a particular illustrative embodiment of the pulse shaper 300 including logic circuitry for receiving the multiphase clock signal comprising the first clock signal 102, the second clock signal 104, and the third clock signal 106 from the ring oscillator 200. The logic circuitry also receives the control signal 118 from the output voltage detection circuit 122 for enabling and disabling the pulse shaper 300. When the control signal 118 provides a logic high, the logic circuitry is enabled and provides an output clock signal responsive to the multiphase clock received from the ring oscillator 200. For example, when the control signal 118 provides a logic high, the logic circuitry of the pulse shaper 300 provides the first output clock signal 108, the second output clock signal 110, and the third clock signal output 112 in response to the first clock signal 102, the second clock signal 104, and the third clock signal 106 received from the ring oscillator 200.

In a particular illustrative embodiment, the logic circuitry of the pulse shaper 300 includes a first AND gate 308, a second AND gate 310, and a third AND gate 312. The first AND gate 308 is configured to receive the first clock signal 102 from the ring oscillator 200 and to receive the control signal 118. The second AND gate 310 is configured to receive the second clock signal 104 from the ring oscillator 200 and to receive the control signal 118. The third AND gate 312 is configured to receive the third clock signal 106 from the ring oscillator 200 and to receive the control signal 118. The pulse shaper 300 is disabled when the control signal 118 is a logic low. When the pulse shaper 300 is disabled, the first, second, and third AND gates 308, 310, and 312, output a logic low at a first AND output 302, a second AND output 304, and a third AND output 306, respectively, regardless of the first, second, and third clock signals 102, 104, and 106. The pulse shaper 300 is enabled when the control signal 118 is a logic high. When the pulse shaper 300 is enabled, the first, second, and third AND gates 308, 310, and 312 output a delayed version of the first, second, and third clock signals 102, 104, and 106 at the first, second and third AND outputs 302, 304, and 306.

The first AND output 302 and the second AND output 304 are provided to logic circuitry to produce the first output clock signal 108 when the control signal 118 enables the pulse shaper 300. For example, the first AND output 302 is provided to a first NAND gate 314 and to a second inverter 328, and the second AND output 304 is provided to a second NAND gate 316 and to a first inverter 326. The output of the first inverter 326 is provided to the first NAND gate 314 and the output of the second inverter 328 is provided to the second NAND gate 316. The outputs of the first and second NAND gates 314 and 316 are provided to a seventh NAND gate 338 that outputs the first output clock signal 108 to the first charge pump unit 410.

The second AND output 304 and the third AND output 306 are provided to logic circuitry to produce the second output clock signal 110 when the control signal 118 enables the pulse shaper 300. For example, the second AND output 304 is provided to a third NAND gate 318 and to a fourth inverter 332, and the third AND output 306 is provided to a fourth NAND gate 320 and to a third inverter 330. The output of the third inverter 330 is provided to the third NAND gate 318 and the output of the fourth inverter 332 is provided to the fourth NAND gate 320. The outputs of the third and fourth NAND gates 318 and 320 are provided to an eighth NAND gate 340 that outputs the second output clock signal 110 to the second charge pump unit 420.

The first AND output 302 and the third AND output 306 are provided to logic circuitry to produce the third output clock signal 112 when the control signal 118 enables the pulse shaper 300. For example, the first AND output 302 is provided to a fifth NAND gate 322 and to a fifth inverter 334, and the third AND output 306 is provided to the fifth NAND gate 322 and to a sixth inverter 336. The outputs of the fifth inverter 334 and the sixth inverter 336 are provided to a sixth NAND gate 324. The sixth NAND gate 324 is a three input NAND gate that also receives the control signal 118 as an input. The output of the sixth NAND gate 324 and the fifth NAND gate 322 are provided to a ninth NAND gate 342 that outputs the third output clock signal 112 to the third charge pump unit 430.

The combination of the first output clock signal 108, the second output clock signal 110, and the third output clock signal 112 comprises a one-hot clock signal where only one of the output clock signals is at a high logic level at any given time. In addition, the transition of one of the output clock signals occurs substantially concurrently with the transition of another output clock signal after the first transition resulting from the enablement of the pulse shaper 300 by the control signal 118. For example, the second output clock signal 110 substantially concurrently transitions from a low logic level to a high logic level when the first output clock signal 108 transitions from a high logic level to a low logic level. When the second output clock signal 110 transitions from a high logic level to a low logic level, the third output clock signal 112 substantially concurrently transitions from a low logic level to a high logic level. When the third output clock signal 112 transitions from a high logic level to a low logic level, the first output clock signal 108 substantially concurrently transitions from a low logic level to a high logic level. While a specific logic circuit configuration is shown with respect to the pulse shaper 300, it should be understood that various hardware and software configurations, or any combination thereof, may be used to produce the output clock signal provided to the charge pump 400.

Figure 4:
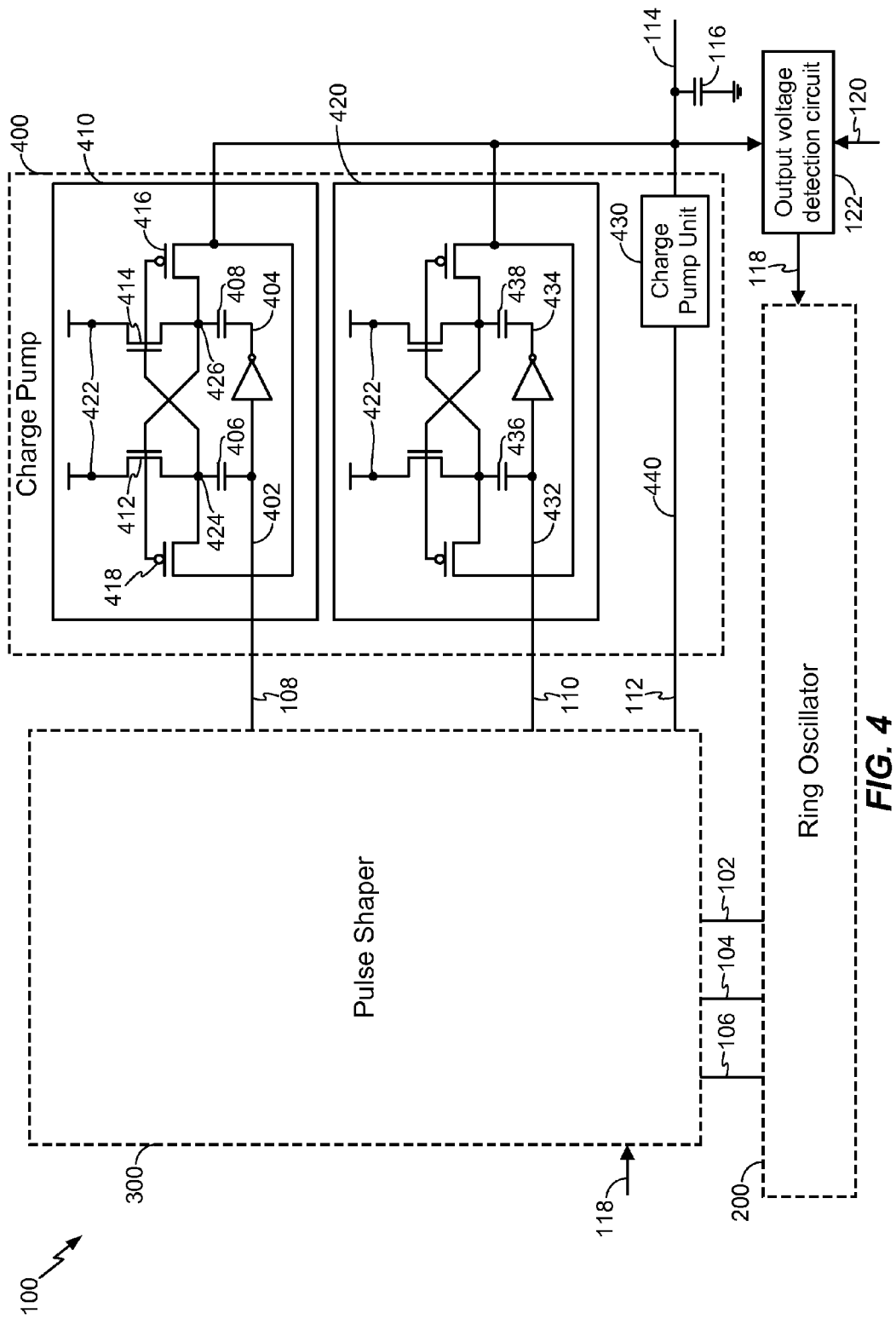
FIG. 4 is a block diagram of a particular illustrative embodiment of a voltage boost circuit.

FIG. 4 illustrates further details of a particular embodiment of the charge pump of the voltage boost circuit 100. In a particular illustrative embodiment, the charge pump 400 includes the first charge pump unit 410 configured to receive the first output clock signal 108, the second charge pump unit 420 configured to receive the second output clock signal 110, and the third charge pump unit 430 configured to receive the third output clock signal 112. The charge pump units 410, 420, and 430, each include circuitry configured to provide a voltage boost to the voltage output 114. The first charge pump unit 410 receives a first input clock signal 402 and a first inverted input clock signal 404. The first inverted clock signal 404 may be provided by the pulse shaper 300 or it may be provided by the first charge pump unit 410 using an inverter gate. When the first input clock signal 402 is a logic level low and the first inverted input clock signal 404 is a logic level high, a first NMOS transistor 412 and a second PMOS transistor 416 are active, or ON, and a second NMOS transistor 414 and a first PMOS transistor 418 are inactive, or OFF. The active first NMOS transistor 412 charges a first capacitor 406 to set the voltage level of a first node 424 to approximately equal the supply voltage level VDD 422, where the first node 424 is isolated from the voltage output 114 as a result of the first PMOS transistor 418 being inactive or OFF. The inactive second NMOS transistor 414 isolates a second node 426 from the supply voltage VDD 422 and the active second PMOS transistor 416 couples the second node 426 to the voltage output 114. A second capacitor 408 coupled to the second node 426 injects charge into the output capacitor 116 and boosts the voltage level of the voltage output 114 when the voltage level at node 426 is greater than the voltage level at the voltage output 114. As a result of the charge injection, the voltage level at the second node 426 begins to drop at a rate determined in part by the size of an output load, the size of the second capacitor 408 and the size of the output capacitor 116. Therefore, prior to the next transition, the voltage level at the first node 424 is approximately the supply voltage VDD 422 and the voltage level at the second node 426 is declining with the voltage level of the voltage output 114 after the boost, as will be described in FIG. 9.

When the first input clock signal 402 transitions from a logic level low to a logic level high, the voltage level at the first node 424 is given a boost from the transition and increases from the supply voltage VDD 422 to approximately twice the supply voltage VDD 422. The voltage boost at the first node 424 deactivates the second PMOS transistor 416 thereby decoupling the second node 426 from the voltage output 114, and activates the second NMOS transistor 414 such that the second capacitor 408 begins to charge or discharge until the voltage level at the second node 426 reaches approximately the supply voltage VDD 422. The voltage boost at the first node 424 deactivates the first NMOS transistor 412 thereby decoupling the first node 424 from the supply voltage VDD 422, and activates the first PMOS transistor 418 to couple the first node 424 to the voltage output 114. The voltage at the first node 424 is approximately twice the supply voltage VDD 422. Once the first node 424 is coupled to the voltage output 114, charge from the first capacitor 406 is injected into the output capacitor 116 thereby raising the voltage level of the voltage output 114. As a result of the charge injection, the voltage level at the first node 424 begins to drop at a rate determined in part by the size of an output load, the size of the first capacitor 406 and the size of the output capacitor 116.

When the first input clock signal 402 transitions from a logic level high to a logic level low, the voltage level at the second node 426 is given a boost from the transition and increases from the supply voltage VDD 422 to approximately twice the supply voltage VDD 422. The voltage boost at the second node 426 deactivates the first PMOS transistor 418 thereby decoupling the first node 424 from the voltage output 114, and activates the first NMOS transistor 412 such that the first capacitor 406 begins to charge or discharge until the voltage level at the first node 424 reaches approximately the supply voltage VDD 422. The voltage boost at the second node 426 deactivates the second NMOS transistor 414 thereby decoupling the second node 426 from the supply voltage VDD 422, and activates the second PMOS transistor 416 to couple the second node 426 to the voltage output 114. The voltage at the second node 426 is approximately twice the supply voltage VDD 422. Once the second node 426 is coupled to the voltage output 114, charge from the second capacitor 408 is injected into the output capacitor 116 thereby raising the voltage level of the voltage output 114. As a result of the charge injection, the voltage level at the second node 426 begins to drop at a rate determined in part by the size of an output load, the size of the second capacitor 408 and the size of the output capacitor 116.

Thus, charge from the first charge pump unit 410 is injected into the output capacitor 116 on both a falling and a rising edge transition of the first input clock signal 402. In a similar manner to the charge pump unit 410, the second charge pump unit 420 injects charge from a third capacitor 436 into the output capacitor 116 when a second clock input signal 432 transitions from a logic level low to a logic level high. In addition, the second charge pump unit 420 injects charge from a fourth capacitor 438 into the output capacitor 116 when the second clock input signal 432 transitions from a logic level high to a logic level low. Thus, charge from the second charge pump unit 420 is injected into the output capacitor 116 on both a falling and rising transition of the second input clock signal 432. The third charge pump unit 430 performs in a similar manner. For example, charge from the third charge pump unit 430 is injected into the output capacitor 116 on both a falling and a rising edge transition of the third input clock signal 440.

In a particular illustrative embodiment, the transition of one of the output clock signals occurs substantially concurrently with the transition of another output clock signal after a first transition resulting from the enablement of the pulse shaper 300 by the control signal 118. For example, a transition from a logic high to a logic low of the first input clock signal 402 may occur substantially concurrently with a transition from a logic low to a logic high of the second input clock signal 432. As a result of two transitions occurring substantially concurrently on the inputs of two charge pump units, the two charge pump units substantially concurrently inject charge into the output capacitor 116 to provide a voltage boost to the voltage level of the voltage output 114. For example, the first capacitor 406 of the first charge pump 410 injects charge into the output capacitor 116 when the first input clock signal 402 transitions from a logic high to a logic low at a first time. Also at the first time, the second input clock signal 432 transitions from a logic low to a logic high and the fourth capacitor 438 injects charge into the output capacitor 116 to provide a voltage boost to the voltage level of the voltage output 114. Therefore, in this configuration in which a transition of one of the output clock signals occurs substantially concurrently with the transition of another output clock signal, two of the charge pump units substantially concurrently provide a voltage boost to the voltage level of the voltage output 114 at each transition after the first transition.

Since two charge pump units inject charge into the output capacitor 116 at each transition, the capacitors of the charge pump units may be substantially reduced in size. For example, the first, second, third, and fourth capacitors 406, 408, 436, and 438 may each be reduced to half the capacitance (e.g., C/2). A capacitor with half the capacitance requires roughly half the area on the semiconductor die. The charge pump unit capacitors take up a significant amount of space on the semiconductor die in relation to the charge pump 400; therefore, reducing the size of the first, second, third, and fourth capacitors 406, 408, 436, and 438 to approximately half the original area saves a significant amount of room on the semiconductor die, allowing for a more compact charge pump 400.

In addition to substantially concurrent transitions of two clock signals, the combination of the first output clock signal 108, the second output clock signal 110, and the third output clock signal 112 comprises a one-hot clock signal where only one of the output clock signals is a logic level high at any given time. For example, the first clock input signal 402 and the second clock input signal 432, corresponding to the first output clock signal 108 and the second output clock signal 110, may not be at a logic level high at the same time. Therefore, when the control signal disables the pulse shaper 300, only one of the output clock signals of the pulse shaper 300 will transition because the other output clock signals remain low as a result of disabling the pulse shaper 300. Furthermore, as described above, charge from the charge pump unit receiving the falling transition is injected into the output capacitor 116. Therefore, when the pulse shaper 300 is disabled by the control signal 118 only one of the charge pump units will inject charge into the output capacitor 116. The injection after the pulse shaper 300 is disabled causes a ripple voltage on the voltage output 114. The size of the voltage ripple on the output corresponds to the size of the capacitor injecting the charge.

In configurations where the pulse shaper 300 is not used, two or more clock signals may transition from a logic high to a logic low when the clock signals are disabled resulting in charge injection from at least two charge pump units. Each of the capacitors in these charge pump units has a capacitance of C. The combination of two of these charge pump units injecting charge into the output capacitor 116 results in a capacitance of 2C. As described above, in the configuration using the pulse shaper 300, only one charge pump unit of the charge pump 400 will inject charge into the output capacitor 116 when the pulse shaper 300 is disabled and the capacitance of the capacitor of the charge pump unit is C/2. Therefore, the size of the capacitance injecting charge into the output capacitor 116 when the clock signal is disabled in the configuration using the pulse shaper 300 is four times smaller than the size of the capacitance injecting charge into the output capacitor 116 in configurations that do not use the pulse shaper 300. As a result of a four times smaller capacitance, the size of the voltage ripple resulting from the disabling of the clock signal using the pulse shaper 300 will be approximately four times smaller than the voltage ripple in configurations without the pulse shaper 300.

Figure 5:
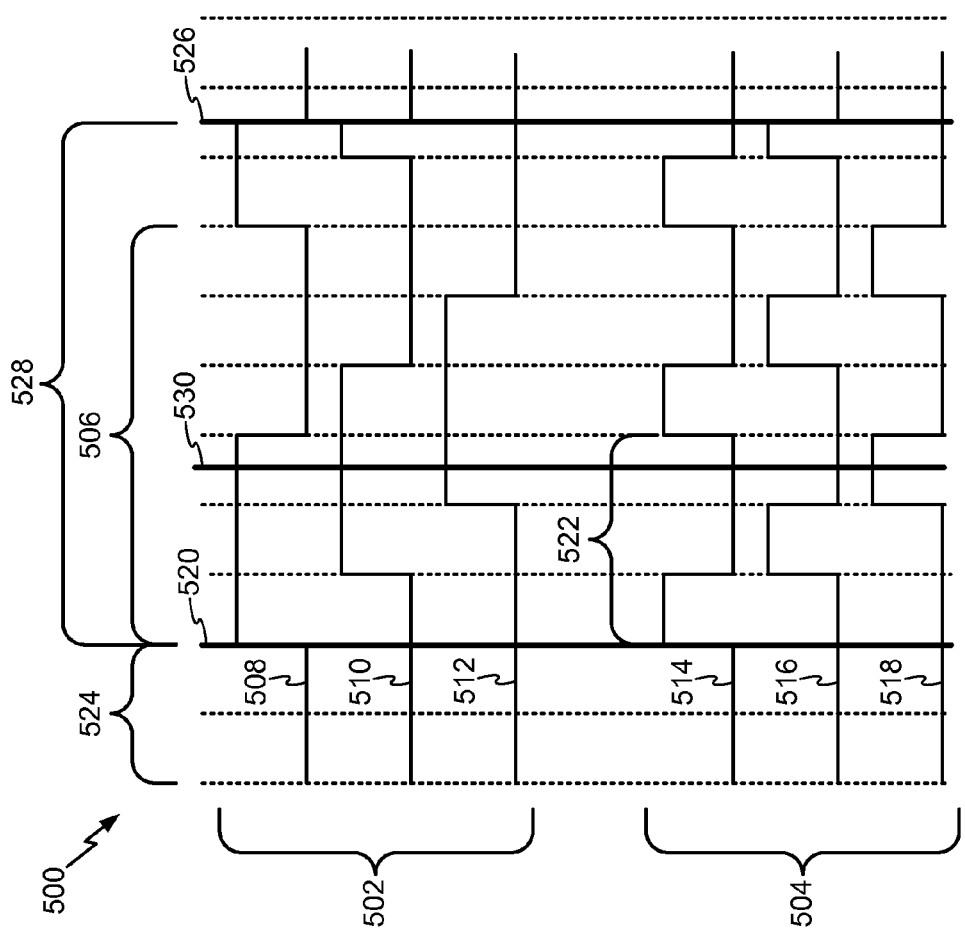
FIG. 5 is a block diagram of a particular illustrative embodiment of a wave form diagram of a voltage boost circuit.

FIG. 5 illustrates a first waveform diagram 500. In a particular illustrative embodiment, input clock waveforms 502 comprise a first input clock waveform 508, a second input clock waveform 510, and a third input clock waveform 512. The input clock waveforms 502 represent the clock signals provided by a ring oscillator. For example, the first input clock waveform 508, the second input clock waveform 510, and the third input clock waveform 512 may correspond to the first clock signal 102, the second clock signal 104, and the third clock signal 106 of FIGS. 1-4 provided by the ring oscillator 200, where the first input clock waveform 508 has the first phase, the second input clock waveform 510 has the second phase different from the first phase, and the third input clock waveform 512 has the third phase different from the first and the second phase. Output clock waveforms 504 comprise a first output clock waveform 514, a second output clock waveform 516, and a third output clock waveform 518. The output clock waveforms 504 represent the clock signals provided by a pulse shaper. For example, the first output clock waveform 514, the second output clock waveform 516, and the third output clock waveform 518 may correspond to the first output clock signal 108, the second output clock signal 110, and the third output clock signal 112 of FIGS. 1-4 provided by the pulse shaper 300.

A first segment 524 of the first waveform diagram 500 represents a period in which the input clock waveforms 502 and the output clock waveforms 504 are disabled. For example, the ring oscillator 200 and the pulse shaper 300 may be disabled by the control signal 118 such that the clock signals provided by the ring oscillator 200 and the pulse shaper 300 are no longer produced. A second segment 528 represents a period in which the input clock waveforms 502 and the output clock waveforms 504 are enabled at a first time 520 and disabled at a second time 526. For example, the ring oscillator 200 and the pulse shaper 300 may be enabled by the control signal 118 at the first time 520 such that the ring oscillator 200 and the pulse shaper 300 produce their respective clock signals until the control signal 118 disables the ring oscillator 200 and the pulse shaper 300 at the second time 526. At the second time 526, the clock signals provided by the ring oscillator 200 and the pulse shaper 300 are no longer produced.

In a particular illustrative embodiment, the input clock waveforms 502 represent clock signals provided by the ring oscillator 200 to the pulse shaper 300. In configurations without the pulse shaper 300, the input clock waveforms 502 represent clock signals that are provided directly to the charge pump. As illustrated in FIG. 5, each of the input clock waveforms 502 has a first period 506 and each of the output clock waveforms 504 has a second period 522, where the second period 522 is half of the first period 506. The first input clock waveform 508, the second input clock waveform 510, and the third input clock waveform 512 of the first waveform diagram 500 have logic high levels that partially overlap due to phase differences between the first, second, and third input clock waveforms 508, 510, and 512, respectively. The phase of each input clock waveform represents a time shift with respect to a reference. For example, the first input clock waveform 508 may serve as a reference and have a phase of 0 degrees. The second input clock waveform 510 may be delayed with respect to the first input clock waveform 508 by a time equal to one sixth the clock period resulting in a 60 degree phase shift from the first input clock waveform 508. Thus the second input clock waveform 510 will have a phase of 60 degrees with respect to the reference. The third input clock waveform 512 may be delayed with respect to the second input clock waveform 510 by a time equal to one sixth the clock period resulting in a 60 degree phase shift from the second input clock waveform 510. Thus the third input clock waveform 512 will have a phase of 120 degrees with respect to the reference. The second input clock waveform 510 is a delayed version of the first input clock waveform 508 and the third input clock waveform 512 is a delayed version of the second input clock waveform 510. For example, referring also to FIG. 2, the delay between the second input clock waveform 510 and the first input clock waveform 508 may be two inverter gate delays and the delay between the third input clock waveform 512 and the second input clock waveform 510 may also be two inverter gate delays resulting in a multiphase clock signal in which the first input clock waveform 508, the second input clock waveform 510, and the third input clock waveform 512 of the first waveform diagram 500 have logic high levels that overlap. Therefore, when the input clock waveforms 502 are disabled at the second time 526, two or more of the waveforms, for example, the first and the second input clock waveform 510 and 512, may transition from a logic high to a logic low. If the input clock waveforms 502 were provided directly to a charge pump, and the two charge pump units having the high to low transition at the second time 526 each had a capacitance of C, the combination of two of these charge pump units injecting charge into the output capacitor 116 results in a capacitance of 2C.

In addition, the output of the pulse shaper 300 comprising the first output clock waveform 514, the second output clock waveform 516, and the third output clock waveform 518 of the first waveform diagram 500 may collectively represent a one-hot clock signal in which only one of the waveforms is a logic high at any given time. Therefore, when the output clock waveforms 504 are disabled at the second time 526, only one of the waveforms, for example, the second output clock waveform 516, transitions from a logic high to a logic low. As discussed with respect to FIG. 4, only one charge pump unit of the charge pump 400 will inject charge into the output capacitor 116 when the pulse shaper 300 is disabled and the capacitance of the capacitor of the charge pump unit is C/2. Therefore, the size of the capacitor injecting charge into the output capacitor 116 when the second output clock waveform is disabled is four times smaller than the size of the capacitor injecting charge into the output capacitor 116 in configurations that do not use the pulse shaper 300. As a result of a four times smaller capacitance, the size of the voltage ripple resulting from the disabling the pulse shaper 300 may be approximately four times smaller than the voltage ripple in configurations without the pulse shaper 300 that provide the input clock waveforms 502 to the charge pump.

Furthermore, if the input clock waveforms 502 are disabled at a third time 530, three of the waveforms, for example, the first, the second, and the third input clock waveforms 508, 510, and 512, transition from a logic high to a logic low. If the input clock waveforms 502 were provided directly to a charge pump, and the three charge pump units having the high to low transition at the third time 530 each had a capacitance of C, the combination of three of these charge pump units injecting charge into the output capacitor 116 results in a capacitance of 3C. In contrast, only one charge pump unit of the charge pump 400 will inject charge into the output capacitor 116 when the pulse shaper 300 is disabled and the capacitance of the capacitor of the charge pump unit is C/2. Therefore, the size of the capacitance injecting charge into the output capacitor 116 if the third output clock waveform 518 is disabled at the third time 530, is six times smaller than the size of the capacitance injecting charge into the output capacitor 116 in configurations that do not use the pulse shaper 300. As a result of a six times smaller capacitance, the voltage ripple resulting from the disabling the pulse shaper 300 may be approximately six times smaller than the voltage ripple in configurations without the pulse shaper 300 that provide the input clock waveforms 502 directly to the charge pump.

Figure 6:
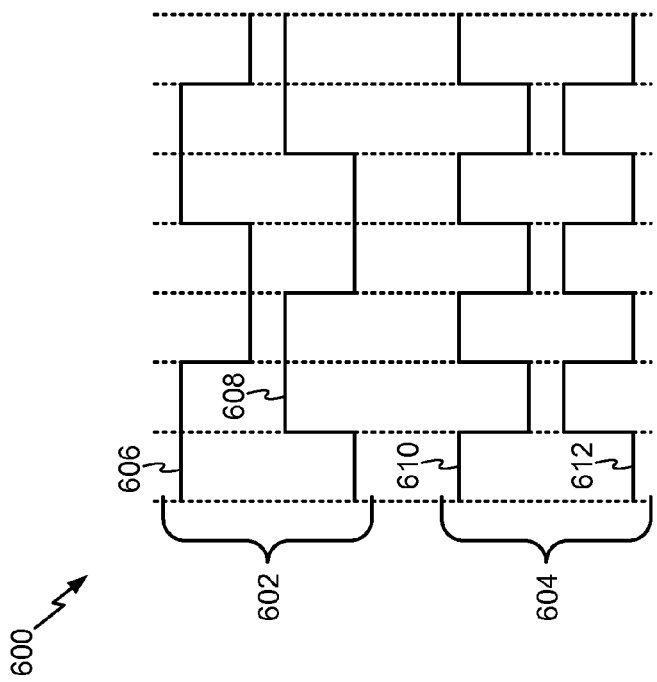
FIG. 6 is a block diagram of a particular illustrative embodiment of a wave form diagram of a voltage boost circuit.

FIG. 6 illustrates a second waveform diagram 600. In a particular illustrative embodiment, second input clock waveforms 602 comprise two clock waveforms. For example, the second input clock waveforms 602 comprise a fourth input clock waveform 606 and a fifth input clock waveform 608. The second input clock waveforms 602 represent the clock signals provided by a ring oscillator. For example, the fourth input clock waveform 606 and the fifth input clock waveform 608 may correspond to the first clock signal 102 and the second clock signal 104, of FIGS. 1-4 provided by the ring oscillator 200, where the third clock signal 106 is not provided. Second output clock waveforms 604 comprise a fourth output clock waveform 610, and a fifth output clock waveform 612. The second output clock waveforms 604 represent the clock signals provided by a pulse shaper. For example, the fourth output clock waveform 610 and the fifth output clock waveform 612 may correspond to the first output clock signal 108 and the second output clock signal 110 of FIGS. 1-4 provided by the pulse shaper 300, where the third output clock signal 112 is not provided In a particular illustrative embodiment, the second input clock waveforms 602 represent clock signals provided by the ring oscillator 200 to the pulse shaper 300. In configurations without the pulse shaper 300, the second input clock waveforms 602 represent clock signals that are provided directly to the charge pump. The fifth input clock waveform 608 is a delayed version of the fourth input clock waveform 606 where both waveforms may have a logic high at the same time. In contrast, the second output clock waveform 604 is a one-hot clock signal in which only one of the waveforms, the fourth output clock waveform 610 and the fifth output clock waveform 612, may be at a logic high at any given time.

Figure 7:
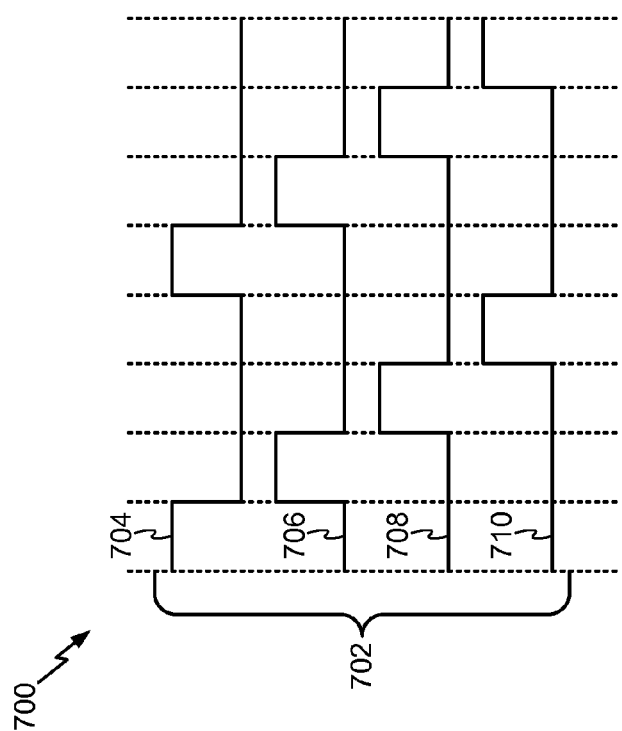
FIG. 7 is a block diagram of a particular illustrative embodiment of a wave form diagram of a voltage boost circuit.

FIG. 7 illustrates a third waveform diagram 700. In a particular illustrative embodiment, third output clock waveforms 702 comprise four output clock waveforms. For example, the third output clock waveforms 702 comprise a sixth output clock waveform 704, a seventh output clock waveform 706, an eighth output clock waveform 708, and a ninth output clock waveform 710. The third output clock waveforms 702 represent the clock signals provided by a pulse shaper to a charge pump where the charge pump includes a number of charge pump units corresponding to the number of output clock waveforms provided by the pulse shaper to the charge pump. For example, the sixth output clock waveform 704, the seventh output clock waveform 706, and the eighth output clock waveform 708 may correspond to the first output clock signal 108, the second output clock signal 110, and the third output clock signal 112 of FIGS. 1-4 provided by the pulse shaper 300, where a fourth output clock signal is also provided by the pulse shaper 300 and corresponds to the ninth output clock waveform 710. As illustrated in FIG. 7, the third output clock waveforms 702 form a one-hot clock signal in which only one of the waveforms is a logic high at any given time. Each of the output clock waveforms is provided to a separate charge pump unit of a charge pump. While four output clock waveforms are shown with respect to FIG. 7, it should be understood that more or fewer output clock waveforms may be provided.

Figure 8:
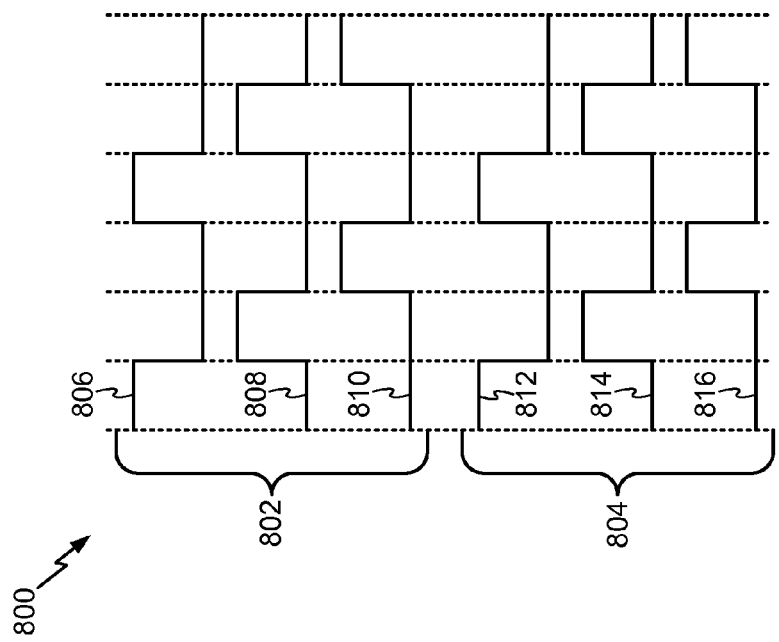
FIG. 8 is a block diagram of a particular illustrative embodiment of a wave form diagram of a voltage boost circuit.

FIG. 8 illustrates a fourth waveform diagram 800. In a particular illustrative embodiment, the fourth waveform diagram 800 comprises fourth output clock waveforms 802 and fifth output clock waveforms 804. The fourth output clock waveforms 802 comprise a tenth output clock waveform 806, an eleventh output clock waveform 808, and a twelfth output clock waveform 810. As illustrated in FIG. 8, the fourth output clock waveforms 802 form a one-hot clock signal in which only one of the waveforms is a logic high at any given time. The fourth output clock waveforms 802 represent the clock signals provided by a first pulse shaper to a charge pump. The first pulse shaper may receive as inputs, clock signals from a first ring oscillator.

The fifth output clock waveforms 804 comprise a thirteenth output clock waveform 812, a fourteenth output clock waveform 814, and a fifteenth output clock waveform 816. As illustrated in FIG. 8, the fifth output clock waveforms 804 also form a one-hot clock signal in which only one of the waveforms is a logic high at any given time. The fifth output clock waveforms 804 represent the clock signals provided by a second pulse shaper to the charge pump. The second pulse shaper may receive as inputs, clock signals from the first ring oscillator or a second ring oscillator. Therefore, using a first pulse shaper and a second pulse shaper similar to the pulse shaper 300 of FIG. 3, two groups of clock signals may be provided such that each group represents a one-hot signal where the first output clock of the first group may be a logic level high concurrently with the first output clock of the second group. For example, the tenth output clock waveform 806 may be a logic level high concurrently with the thirteenth output clock waveform 812.

Alternatively, the fourth and fifth output clock waveforms 802 and 804 may both be provided by the same pulse shaper configured to provide two groups of output clock signals such that each group represents a one-hot signal where the first output clock of the first group may be a logic level high concurrently with the first output clock of the second group. While two groups of output clock waveforms are shown with respect to FIG. 8, it should be understood that more or fewer groups of output clock waveforms may be provided.

Figure 9:
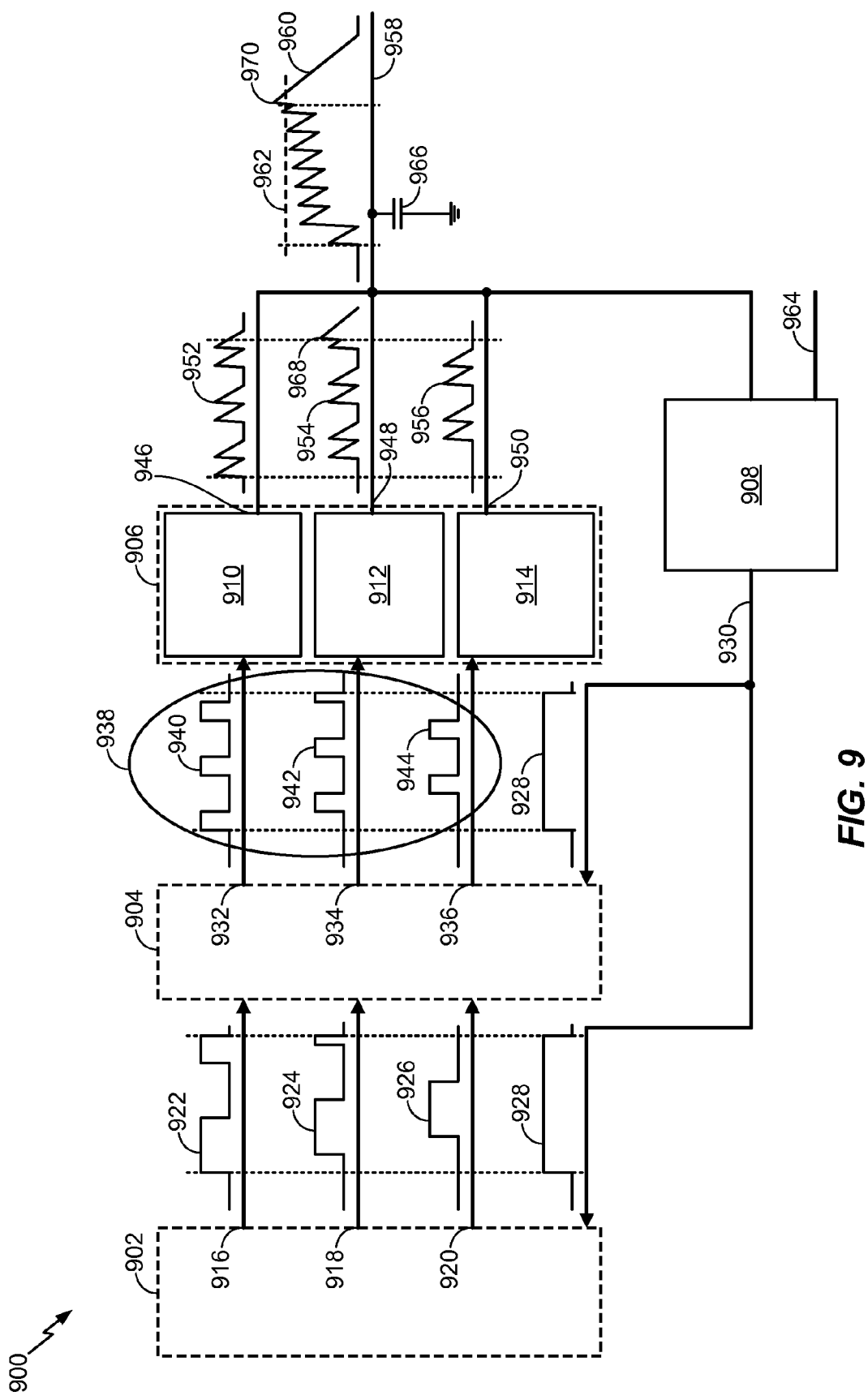
FIG. 9 is a block diagram of a particular illustrative embodiment of a voltage boost circuit.

FIG. 9 illustrates a voltage boost circuit 900 including an illustration of waveforms produced by the various components of the voltage boost circuit 900. In a particular illustrative embodiment, the voltage boost circuit 900 includes a ring oscillator 902, a pulse shaper 904, a charge pump 906 and an output voltage detection circuit 908. The charge pump 906 includes a first charge pump unit 910, a second charge pump unit 912, and a third charge pump unit 914. While three charge pump units are shown with respect to FIG. 9, it should be understood that the charge pump 906 may include more or fewer charge pump units than shown.

In a particular illustrative embodiment, the output voltage detection circuit 908 receives a voltage output 958 of the charge pump 906 and a reference voltage 964. Based on the voltage output 958 and the reference voltage 964, the output voltage detection circuit 908 provides a control signal 930 to enable or disable the ring oscillator 902 and the pulse shaper 904. A control signal waveform 928 corresponding to the control signal 930 illustrates that the ring oscillator 902 and the pulse shaper 904 are enabled when the control signal waveform 928 is a logic high and disabled when the control signal waveform 928 is a logic low.

Upon receipt of the control signal 930 enabling the ring oscillator 902, the ring oscillator 902 provides a first clock signal 916, a second clock signal 918, and a third clock signal 920 to the pulse shaper 904. In a particular embodiment, the first clock signal 916, the second clock signal 918, and the third clock signal 920 may comprise a multiphase clock where the first clock signal 916 has a first phase, the second clock signal 918 has a second phase different from the first phase, and the third clock signal 920 has a third phase different from the first and second phase. A first clock signal waveform 922, a second clock signal waveform 924, and a third clock signal waveform 926 illustrate enabled and disabled outputs of the ring oscillator 902. The second clock signal waveform 924 is a delayed version of the first clock signal waveform 922 in which the two waveforms have logic high levels that overlap. The third clock signal waveform 926 is a delayed version of the second clock signal waveform 924 in which the two waveforms have logic high levels that overlap. In addition, the first clock signal waveform 922 and the third clock signal waveform 926 may have logic high portions that overlap. When the control signal 930 disables the ring oscillator 902, two of more of the waveforms provided by the ring oscillator 902 may transition from a logic high to a logic low. While three clock signals are shown with respect to FIG. 9, it should be understood that the ring oscillator 902 may provide more or fewer clock signals than shown.

The pulse shaper 904 receives the first clock signal 916, the second clock signal 918, and the third clock signal 920 from the ring oscillator. The pulse shaper 904 also receives the control signal 930 from the output voltage detection circuit 908. When the pulse shaper 904 is enabled by the control signal 930, the pulse shaper 904 provides a clock signal to the charge pump 906. In a particular illustrative embodiment, a first output clock signal waveform 940, a second output clock signal waveform 942, and a third output clock signal waveform 944 illustrate enabled and disabled outputs of the pulse shaper 904. Each of the output clock signals 932, 934, and 936 corresponding to the waveforms 940, 942, and 944 of the pulse shaper 904 are provided to each charge pump unit of the charge pump 906. For example, the pulse shaper 904 may provide a first output clock signal 932 to the first charge pump unit 910, a second output clock signal 934 to the second charge pump unit 912, and a third output clock signal 936 to the third charge pump unit 914. The combination of the first output clock signal 932, the second output clock signal 934, and the third output clock signal 936 may comprise a one-hot clock signal 938 where only one of the output clock signals is a logic level high at any given time. For example, as illustrated by the first output clock signal waveform 940, the second output clock signal waveform 942, and the third output clock signal waveform 944, only one of the output clock signals may be a logic level high at any given time; therefore, none of the logic high portions of the output clock signal waveforms overlap, except for, perhaps a brief period during transitioning. As a result of having only one signal a logic level high at any given time, only one transition from a logic high to a logic low will occur when the control signal 930 disables the pulse shaper 904. While three output clock signals are shown with respect to FIG. 9, it should be understood that the pulse shaper 904 may provide more or fewer clock output signals than shown.

In a particular illustrative embodiment, the transition of one of the output clock signals occurs substantially concurrently with the transition of another output clock signal after a first transition resulting from the enablement of the pulse shaper 904 by the control signal 930. For example, when the first output clock signal waveform 940 transitions from a high logic level to a low logic level, the second output clock signal waveform 942 substantially concurrently transitions from a low logic level to a high logic level. When the second output clock signal waveform 942 transitions from a high logic level to a low logic level, the third output clock signal waveform 944 substantially concurrently transitions from a low logic level to a high logic level. When the third output clock signal waveform 944 transitions from a high logic level to a low logic level, the first output clock signal waveform 940 substantially concurrently transitions from a low logic level to a high logic level.

However, only one transition will occur on the first transition after the pulse shaper 904 is enabled by the control signal 930. For example, the control signal waveform 928, corresponding to the control signal 930, illustrates a waveform of a disabled output clock signal of the pulse shaper 904 when the control signal waveform 928 is a logic low. The control signal waveform 928 transitions from a logic low to a logic high to enable the pulse shaper 904, and in response, only one of the output clock signal waveforms 940-944 may transition to a high logic level because only one of the output clock signal waveforms 940-944 may be a logic high at any given time. Thus, only one transition will occur on the first transition after the pulse shaper 904 is enabled by the control signal 930. While three output clock signals are shown with respect to FIG. 9, it should be understood that the pulse shaper 904 may provide more or fewer clock output signals than shown. In addition, the multiple output clock signals of the pulse shaper 904 may be divided into groups of such that each group represents a one-hot signal where the first output clock of the first group may be a logic level high concurrently with the first output clock of the second group.

Each transition of the output clock signals 932, 934, and 936, whether a high-to-low transition or a low-to-high transition, provides a voltage boost to the voltage output 958. Therefore, apart from the first transition after the pulse shaper 904 is enabled, two of the charge pumps will provide voltage boosts to the output voltage 958 substantially concurrently because two of the clock signals transition substantially concurrently at each transition. For example, when the first output clock signal 932 transitions from a high to a low and the second output clock signal 934 substantially concurrently transitions from a low to a high, both the first charge pump unit 910 and the second charge pump unit 920 provide a first charge pump output 946 and a second charge pump output 948 to the voltage output 958. When the second output clock signal 934 transitions from a high to a low and the third output clock signal 936 substantially concurrently transitions from a low to a high, both the second charge pump unit 920 and the third charge pump unit 930 provide the second charge pump output 948 and a third charge pump output 950 to the voltage output 958. When the third output clock signal 936 transitions from a high to a low and the first output clock signal 932 substantially concurrently transitions from a low to a high, both the third charge pump unit 930 and the first charge pump unit 910 provide the third charge pump output 950 and the first charge pump output 946 to the voltage output 958. A first voltage boost waveform 952 corresponding to the first charge pump output 946 illustrates an output of the first charge pump unit 910. A second voltage boost waveform 954 corresponding to the second charge pump output 948 illustrates an output of the second charge pump unit 917. The third voltage boost waveform 956 corresponding to the third charge pump output 950, illustrates the output of the third charge pump unit 914.

Therefore, two of the charge pump units 910, 912, and 914, substantially concurrently provide voltage boosts that charge an output capacitor 966. The output capacitor 966 maintains the voltage level of the voltage output 958. The voltage output 958 may be used to provide a DC reference voltage to circuitry elements requiring a reference voltage higher than an applied supply voltage provided. The voltage output 958 is also provided to the output voltage detection circuit 908 to monitor the voltage output 958. When the output voltage detection circuit 908 determines that the voltage output 958 is too high, the output voltage detection circuit 908 disables the ring oscillator 902 and the pulse shaper 904. For example, a combined voltage boost waveform 962 represents the combined voltage boosts of the first, second, and third voltage boost waveforms 952, 954, and 956. When the voltage level of the combined voltage boost waveform 960 exceeds a determined threshold voltage 962, the voltage detection circuit 908 provides a logic low control signal 930 to disable the ring oscillator 902 and the pulse shaper 904.

When the voltage boosts are no longer provided to the output capacitor 966, the charge on the output capacitor dissipates at a rate faster than the charge is replenished and the voltage level of the voltage output 958 drops. When the output voltage detection circuit 908 determines that the voltage output 958 has dropped below a certain voltage level, the output voltage detection circuit 908 enables the ring oscillator 902 and the pulse shaper 904. As a result of enabling the ring oscillator 902 and the pulse shaper 904, the output clock signals 932, 934, and 936 are provided to the charge pump 906 and the charge pump provides voltage boosts to charge the output capacitor 966. When the voltage boosts are provided to the output capacitor 966, the charge on the output capacitor is maintained or increases at a rate faster than the charge can dissipate. Therefore, the voltage level of the voltage output 958 is maintained or increases.

As a result of disabling the ring oscillator 902 and the pulse shaper 904, the output clock signals 932, 934, and 936 are no longer provided to the charge pump 906 and the charge pump 906 ceases to provide voltage boosts to charge the output capacitor 966. In addition, as discussed above with respect to FIG. 4, even on a falling edge transition of an output clock signal provided by the pulse shaper 904, charge from the charge pump unit receiving the falling transition is injected into the output capacitor 966. Therefore, when the pulse shaper 904 is disabled by the control signal 930, one of the charge pump units will inject charge into the output capacitor 966 resulting in a ripple voltage on the voltage output 958. For example, when the control signal 930 transitions from a logic high to a logic low, as shown by control signal waveform 928, the second clock output signal 934 transitions from a logic high to a logic low as shown by the second clock output signal waveform 942, while the first output clock signal 932 and the third output clock signal 936 remain a logic low. As a result of the transition from high to low of the second output clock signal 934, the second charge pump unit 912 provides a voltage boost 968 as shown by the second voltage boost waveform 954. The voltage boost 968 is a ripple voltage that is proportional to the size of the capacitor utilized by the second charge pump unit 912 in which a smaller capacitance results in a smaller ripple voltage. The voltage boost 968 caused by the disabling of the pulse shaper 904 appears on the voltage output 958 as an output ripple voltage 970.

It should be understood that the first, second, third, and combined voltage boost waveforms 952, 954, 956, and 960 are provided for illustrative purposes only and the rate at which the voltage decreases after each boost may vary from that which is illustrated.

Figure 10:
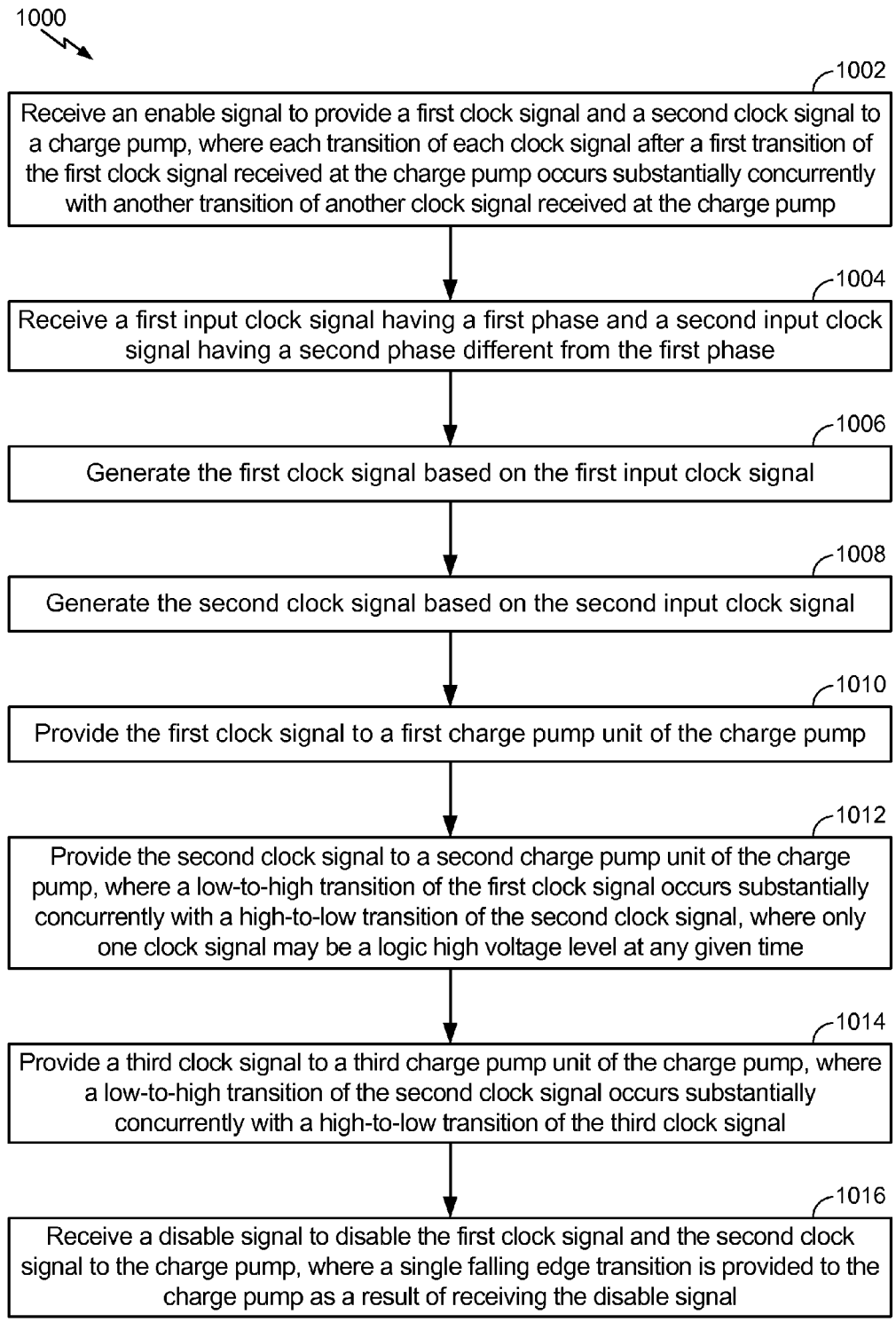
FIG. 10 is a flow chart of a particular illustrative embodiment of a method of providing a clock signal to a charge pump.

Referring to FIG. 10, a particular embodiment of a method is illustrated. The method may include receiving an enable signal to provide a first clock signal and a second clock signal to a charge pump, at 1002. For example, referring to FIG. 9, the control signal 930 is provided to the pulse shaper 904 to enable the pulse shaper 904. The enabled pulse shaper 904 provides the first output clock signal 932 and the second output clock signal 934 to the charge pump 906. Each transition of each clock signal after a first transition of the first clock signal received at the charge pump may occur substantially concurrently with another transition of another clock signal received at the charge pump. For example, the control signal waveform 928 of FIG. 9 transitions from a logic low to a logic high to enable the pulse shaper 904 and only one of the output clock signal waveforms may transition to a high logic level because only one of the output clock signal waveforms may be high at any given time. Thus, only one transition will occur on the first transition after the pulse shaper 904 is enabled by the control signal 930.

In subsequent transitions occurring while the pulse shaper 906 is enabled, one output clock signal transitions from a high to a low while another output clock signal transitions from a low to a high substantially concurrently. For example, when the first output clock signal waveform 940 transitions from a high logic level to a low logic level, the second output clock signal waveform 942 substantially concurrently transitions from a low logic level to a high logic level. When the second output clock signal waveform 942 transitions from a high logic level to a low logic level, the third output clock signal waveform 944 substantially concurrently transitions from a low logic level to a high logic level. When the third output clock signal waveform 944 transitions from a high logic level to a low logic level, the first output clock signal waveform 940 substantially concurrently transitions from a low logic level to a high logic level.

In a particular embodiment, at least two charge pump units are activated concurrently in response to each transition after the first transition. For example, as described above with respect to FIG. 4, both a falling edge transition and a rising edge transition will substantially concurrently activate a charge pump unit to provide a voltage boost to the voltage output 114. Because subsequent transitions after the first transition while the pulse shaper 300 is enabled include a falling edge transition to one of the charge pump units and a rising edge transition to another of the charge pump units, at least two of the charge pumps are activated concurrently to provide a voltage boost to the voltage output 114.

The first input clock signal having a first phase and a second input clock signal having a second phase different from the first phase are received, at 1004. For example, the first, the second, and the third clock signals 916, 918, and 920 of FIG. 9 are provided by the ring oscillator 902 to the pulse shaper 904. The second clock signal 918 is a delayed version of the first clock signal 916 and the third clock signal 920 is a delayed version of the second clock signal 918 as illustrated by the first, second, and third clock signal waveforms 922, 924, and 926. Therefore, each clock signal has a different phase. As another example, the first input clock waveforms 502 of FIG. 5 includes multiple input clock signals where each input clock signal is represented by a waveform that has a different phase.

The first clock signal may be generated based on the first input clock signal, at 1006, and the second clock signal may be generated based on the second input clock signal, at 1008. For example, the pulse shaper 300 of FIG. 3 includes logic circuitry configured to receive the multiphase clock signal comprising the first clock signal 102, the second clock signal 104, and the third clock signal 106 from the ring oscillator 200 and to generate an output clock signal responsive to the multiphase clock received from the ring oscillator 200. Therefore, the logic circuitry of the pulse shaper 300 provides the first output clock signal 108, the second output clock signal 110, and the third clock signal output 112 responsive to the first clock signal 102, the second clock signal 104, and the third clock signal 106 received from the ring oscillator 200. A third output clock signal may also be generated, such as illustrated in FIG. 3. A first period of the first clock signal may be approximately half of a period of the first input clock signal. For example, each of the input clock waveforms 502 of FIG. 5 has a first period 506 and each of the output clock waveforms 504 has a second period 522, where the second period 522 is half of the first period 506.

The first clock signal is provided to a first charge pump unit of a charge pump, at 1010, and the second clock signal is provided to a second charge pump unit of the charge pump, at 1012. A low-to-high transition of the first clock signal occurs substantially concurrently with a high-to-low transition of the second clock signal. The method may further include providing a third clock signal to a third charge pump unit of the charge pump, at 1014. A low-to-high transition of the second clock signal may occur substantially concurrently with a high-to-low transition of the third clock signal. Furthermore, only one clock signal may be at a logic high voltage level at any given time. For, example, the clock signals may be the one-hot clock signal 938 of FIG. 9.

The first charge pump unit may include a first capacitor coupled to an output of the charge pump, the first capacitor configured to at least partially discharge to the output in response to the low-to-high transition of the first clock signal. The second charge pump unit may include a second capacitor coupled to the output of the charge pump, the second capacitor configured to at least partially discharge to the output in response to the high-to-low transition of the second clock signal. For example, the first capacitor may be the first capacitor 406 and the second capacitor may be the fourth capacitor 438 of FIG. 4.

In a particular embodiment, a first charge pump unit includes a third capacitor coupled to the output of the charge pump, the third capacitor configured to at least partially discharge to the output in response to a high-to-low transition of the first clock signal. In addition, the second charge pump unit may include a fourth capacitor coupled to the output of the charge pump, the fourth capacitor configured to at least partially discharge to the output in response to a low-to-high transition of the second clock signal. For example, the fourth capacitor may be the third capacitor 436 of FIG. 4 that injects charge into the output capacitor 116 when a second clock input signal 432 transitions from a logic level low to a logic level high. In addition, the third capacitor may be the fourth capacitor 438 of FIG. 4 that injects charge into the output capacitor 116 when a second clock input signal 432 transitions from a logic level high to a logic level low.

A disable signal may be received to disable the first clock signal and the second clock signal to the charge pump, at 1016. A single falling edge transition is provided to the charge pump as a result of receiving the disable signal. For example, the disable signal may be the control signal 930 of FIG. 9 in a logic low voltage state. As a result of having only one signal a logic level high at any given time when the pulse shaper 904 is enabled, only one transition from a logic high to a logic low will occur when the control signal 930 disables the pulse shaper 904.

As another example, FIG. 5 illustrates that the output of the pulse shaper 300 including the first output clock waveform 514, the second output clock waveform 516, and the third output clock waveform 518 of the first waveform diagram 500 may collectively represent a one-hot clock signal in which only one of the waveforms is a logic high at any given time. When the output clock waveforms 504 are disabled at the second time 526, only one of the waveforms, for example, first output clock waveform 516, transitions from a logic high to a logic low.

The method 1000 of FIG. 10 may be performed at a processor integrated into an electronic device. For example, as will be described with respect to FIG. 12, the enable signal and the disable signal may be received by a computer or other electronic device. Alternatively, or in addition, one of skill in the art will recognize that the method 1000 of FIG. 10 may be implemented or initiated by a field programmable gate array (FPGA), an application-specific integrated circuit (ASIC), a central processing unit (CPU), a digital signal processor (DSP), a controller, another hardware device, or any combination thereof.

Figure 11:
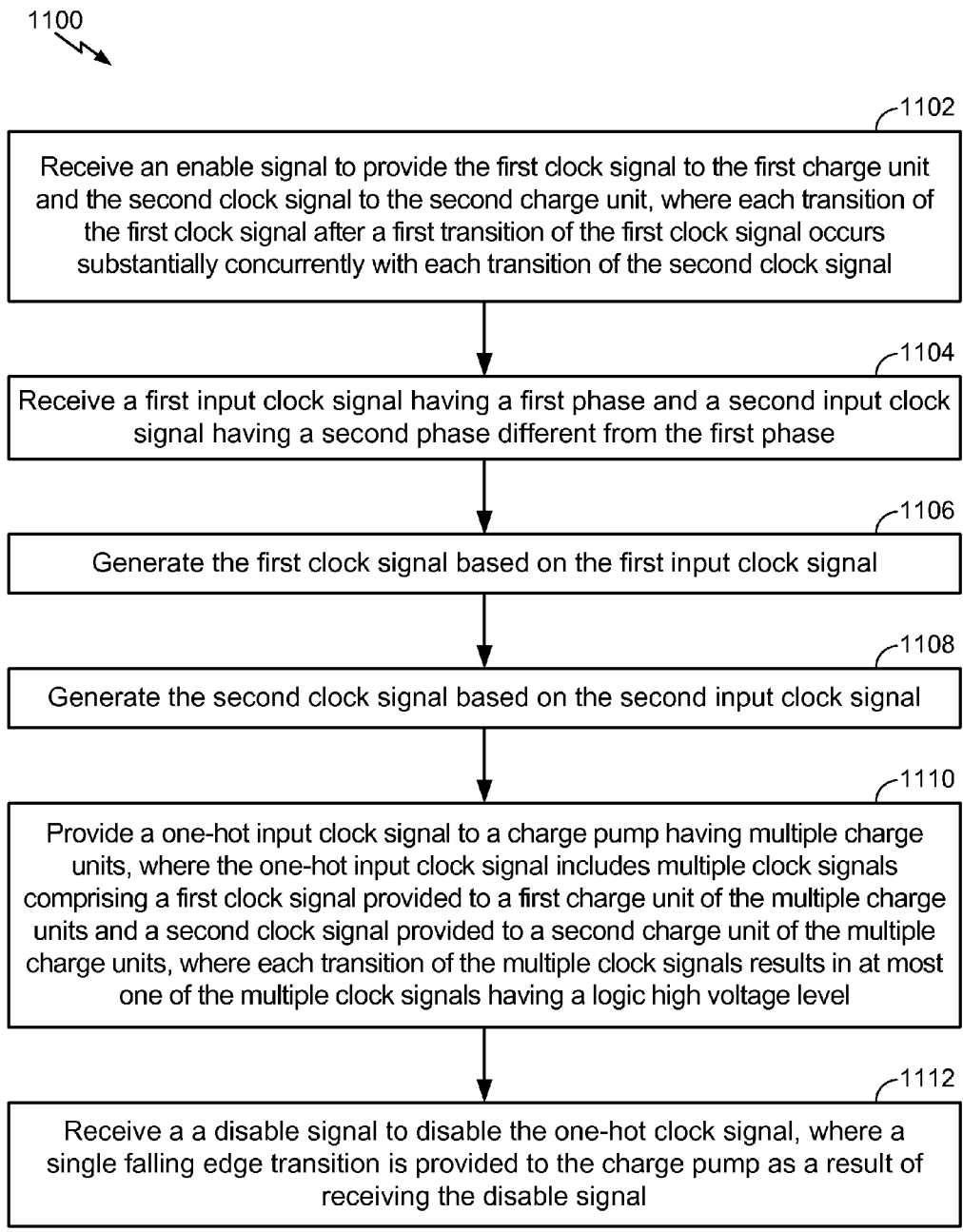
FIG. 11 is a flow chart of a particular illustrative embodiment of a method of providing a clock signal to a charge pump.

Referring to FIG. 11, a particular embodiment of a method is illustrated. The method may include receiving an enable signal to provide a first clock signal to a first charge pump unit and a second clock signal to a second charge pump unit, at 1102. For example, the enable signal may be the control signal 930 of FIG. 9 at a logic high voltage level. The control signal 930 of FIG. 9 is provided to the pulse shaper 904 to enable the pulse shaper 904. The enabled pulse shaper 904 provides the first output clock signal 932 and the second output clock signal 934 to the charge pump 906.

Each transition of the first clock signal after a first transition of the first clock signal may occur substantially concurrently with each transition of the second clock signal. For example, referring to FIG. 9, only one transition will occur on the first transition after the pulse shaper 904 is enabled by the control signal 930. The control signal waveform 928 transitions from a logic low to a logic high to enable the pulse shaper 904 and only one of the output clock signal waveforms may transition to a high logic level because only one of the output clock signal waveforms may be high at any given time. Thus, only one transition will occur on the first transition after the pulse shaper 904 is enabled by the control signal 930. In subsequent transitions occurring while the pulse shaper 906 is enabled, one output clock signal transitions from a high to a low while another output clock signal transitions from a low to a high substantially concurrently. For example, when the first output clock signal waveform 940 transitions from a high logic level to a low logic level, the second output clock signal waveform 942 substantially concurrently transitions from a low logic level to a high logic level. When the second output clock signal waveform 942 transitions from a high logic level to a low logic level, the third output clock signal waveform 944 substantially concurrently transitions from a low logic level to a high logic level. When the third output clock signal waveform 944 transitions from a high logic level to a low logic level, the first output clock signal waveform 940 substantially concurrently transitions from a low logic level to a high logic level.

A first input clock signal having a first phase and a second input clock signal having a second phase different from the first phase may be received, at 1104. For example, the first, the second, and the third clock signals 916, 918, and 920 of FIG. 9 are provided by the ring oscillator 902 to the pulse shaper 904. The second clock signal 918 is a delayed version of the first clock signal 916 and the third clock signal 920 is a delayed version of the second clock signal 918 as illustrated by the first, second, and third clock signal waveforms 922, 924, and 926. Therefore, each clock signal has a different phase. As another example, FIG. 5 illustrates the first input clock waveforms 502 where each input clock signal represented by a waveform has a different phase.

The method of FIG. 11 may further include generating the first clock signal based on the first input clock signal, at 1106, and generating the second clock signal based on the second input clock signal, at 1108. For example, the pulse shaper 300 of FIG. 3 includes logic circuitry configured to receive the multiphase clock signal comprising the first clock signal 102, the second clock signal 104, and the third clock signal 106 from the ring oscillator 200 and to provide the first output clock signal 108, the second output clock signal 110, and the third clock signal output 112 based on the first clock signal 102, the second clock signal 104, and the third clock signal 106 received from the ring oscillator 200.

A one-hot input clock signal is provided to a charge pump having multiple charge pump units, at 1110. The one-hot input clock signal includes multiple clock signals comprising a first clock signal provided to a first charge pump unit of the multiple charge pump units and a second clock signal provided to a second charge pump unit of the multiple charge pump units. Each transition of the multiple clock signals results in at most one of the multiple clock signals having a logic high voltage level. The one-hot input clock signal may also include a third clock signal provided to a third charge pump unit of the multiple charge pump units.

Each transition of the first clock signal may activate the first charge pump unit and each transition of the second clock signal may activate the second charge pump unit. For example, in the charge pump 400 of FIG. 4, both a falling edge transition and a rising edge transition will substantially concurrently activate a charge pump unit to provide a voltage boost to the voltage output 114. Because subsequent transitions after the first transition while the pulse shaper 300 is enabled include a falling edge transition to one of the charge pump units and a rising edge transition to another of the charge pump units, at least two of the charge pumps are activated concurrently to provide a voltage boost to the voltage output 114.

For example, each of the output clock signals 932, 934, and 936 of FIG. 9 corresponding to the waveforms 940, 942, and 944 of the pulse shaper 904 are provided to each charge pump unit of the charge pump 906. For example, the pulse shaper 904 may provide a first output clock signal 932 to the first charge pump unit 910, a second output clock signal 934 to the second charge pump unit 912, and a third output clock signal 936 to the third charge pump unit 914. The combination of the first output clock signal 932, the second output clock signal 934, and the third output clock signal 936 may comprise a one-hot clock signal 938 where only one of the output clock signals is a logic level high at any given time. For example, as illustrated by the first output clock signal waveform 940, the second output clock signal waveform 942, and the third output clock signal waveform 944, only one of the output clock signals may be a logic level high at any given time, therefore, none of the logic high portions of the output clock signal waveforms overlap.

In addition, the transition of one of the output clock signals of FIG. 9 occurs substantially concurrently with the transition of another output clock signal after a first transition resulting from the enablement of the pulse shaper 904 by the control signal 930. For example, when the first output clock signal waveform 940 transitions from a high logic level to a low logic level, the second output clock signal waveform 942 substantially concurrently transitions from a low logic level to a high logic level. When the second output clock signal waveform 942 transitions from a high logic level to a low logic level, the third output clock signal waveform 944 substantially concurrently transitions from a low logic level to a high logic level. When the third output clock signal waveform 944 transitions from a high logic level to a low logic level, the first output clock signal waveform 940 substantially concurrently transitions from a low logic level to a high logic level.

A disable signal may be received to disable the one-hot clock signal, at 1112. A single falling edge transition is provided to the charge pump as a result of receiving the disable signal. For example, the disable signal may be the control signal 930 of FIG. 9 in a logic low voltage state. As a result of having only one signal a logic level high at any given time when the pulse shaper 904 is enabled, only one transition from a logic high to a logic low will occur when the control signal 930 disables the pulse shaper 904.

As another example, FIG. 5 illustrates that the output of the pulse shaper 300 including the first output clock waveform 514, the second output clock waveform 516, and the third output clock waveform 518 of the first waveform diagram 500 may collectively represent a one-hot clock signal in which only one of the waveforms is a logic high at any given time. When the output clock waveforms 504 are disabled at the second time 526, only one of the waveforms, for example, first output clock waveform 516, transitions from a logic high to a logic low.

The method 1100 of FIG. 11 may be performed at a processor integrated into an electronic device. For example, as will be described with respect to FIG. 12, an enable signal and a disable signal to control the system of FIGS. 1-4 or FIG. 9, or any combination thereof, may be received by a computer or other electronic device. Alternatively, or in addition, one of skill in the art will recognize that the method 1100 of FIG. 11 may be implemented or initiated by a field programmable gate array (FPGA), an application-specific integrated circuit (ASIC), a central processing unit (CPU), a digital signal processor (DSP), a controller, another hardware device, or any combination thereof.

Figure 12:
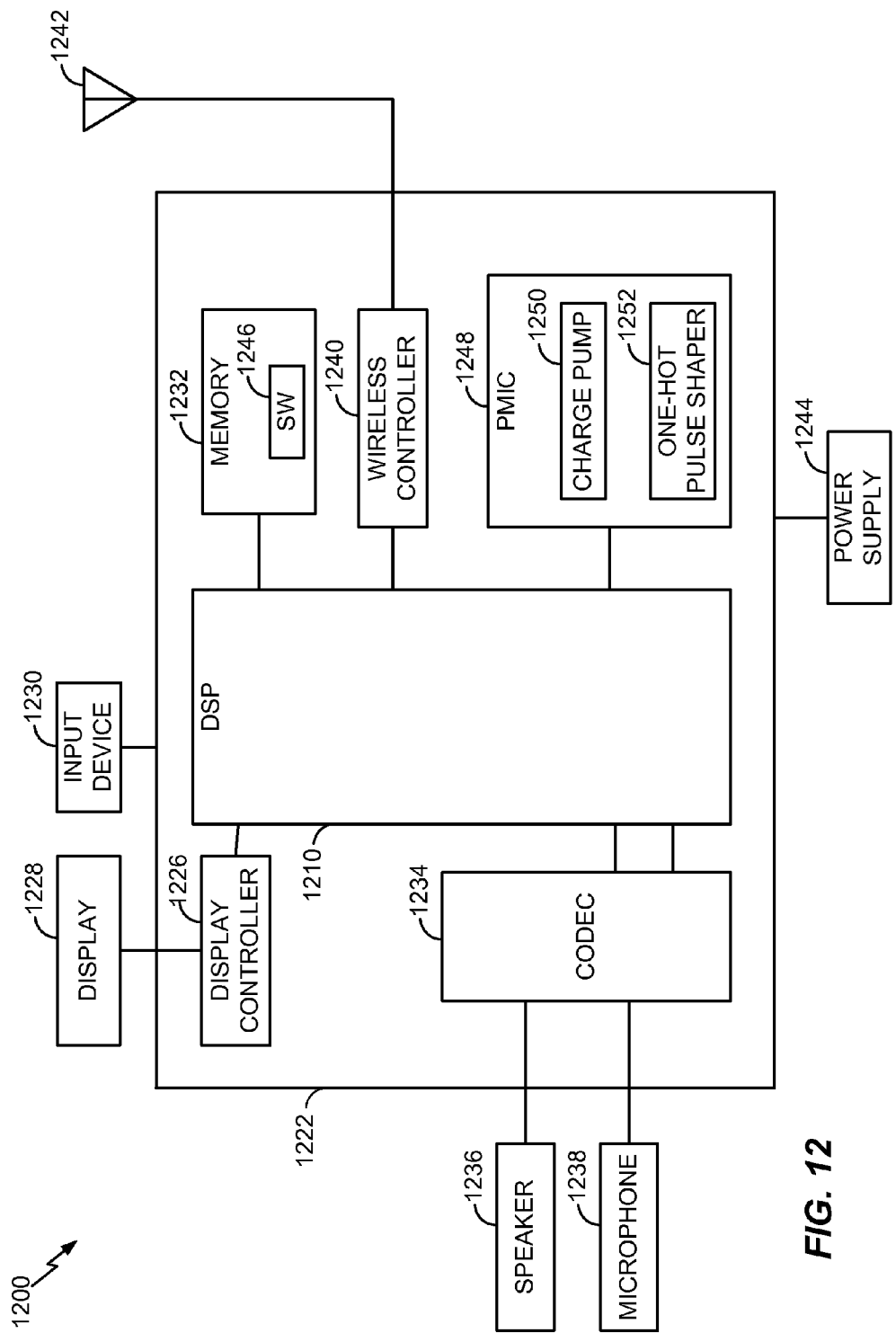
FIG. 12 is a block diagram of an electronic device including a voltage boost circuit.

Referring to FIG. 12, a block diagram of a particular illustrative embodiment of an electronic device including a one-hot pulse shaper 1252 coupled to a charge pump 1250 is depicted and generally designated 1200. The device 1200 includes a processor, such as a digital signal processor (DSP) 1210, coupled to a memory 1232 and also coupled to a power management integrated circuit (PMIC) 1248. In an illustrative example, the PMIC 1248 includes the charge pump 1250 and the one-hot pulse shaper 1252. The charge pump 1250 and the one-hot pulse shaper 1252 may include one or more of the systems depicted in FIGS. 1-4 and 9 and may perform one or more of the methods of FIG. 10 or 11, or any combination thereof.

FIG. 12 also shows a display controller 1226 that is coupled to the digital signal processor 1210 and to a display 1228. A coder/decoder (CODEC) 1234 can also be coupled to the digital signal processor 1210. A speaker 1236 and a microphone 1238 can be coupled to the CODEC 1234.

FIG. 12 also indicates that a wireless controller 1240 can be coupled to the digital signal processor 1210 and to a wireless antenna 1242. In a particular embodiment, the DSP 1210, the display controller 1226, the memory 1232, the CODEC 1234, the wireless controller 1240, and the PMIC 1248 are included in a system-in-package or system-on-chip device 1222.

The memory 1232 may include software (SW) 1246 having instructions to that, when executed, instruct the one-hot pulse shaper 1252 to provide a one-hot clock signal to the charge pump 1250. For example the memory 1232 may be a computer readable tangible medium and the software 1246 may include instructions that are executable by a computer, such as the processor 1210, to receive an enable signal to provide a first clock signal and a second clock signal to the charge pump 1250, where each transition of each clock signal after a first transition of the first clock signal received at the charge pump 1250 occurs substantially concurrently with another transition of another clock signal received at the charge pump 1250. The software 1246 may also include instructions that are executable to receive a disable signal to disable the first clock signal and the second clock signal to the charge pump 1250, where a single falling edge transition is provided to the charge pump 1250 as a result of receiving the disable signal, and where only one clock signal may be a logic high voltage level at any given time. The software 1246 may further include instructions that are executable to communicate with a ring oscillator to receive a multiphase clock output signal, to generate multiple input clock signals, where the multiple input clock signals are configured such that each transition of each input clock signal occurs substantially concurrently with another transition of another input clock signal of the multiple input clock signals, to provide the multiple input clock signals to the charge pump 1250 having multiple charge pump units, and to provide a third clock signal to a third charge pump unit of the charge pump 1250, where a low-to-high transition of the second clock signal occurs substantially concurrently with a high-to-low transition of the third clock signal. The software 1246 may still further include instructions that are executable to receive a first input clock signal having a first phase and a second input clock signal having a second phase different from the first phase, to generate the first clock signal based on the first input clock signal, and to generate the second clock signal based on the second input clock signal. Although the charge pump 1250 and the one-hot pulse shaper 1252 are shown in the PMIC 1248, in other embodiments, the charge pump 1250 and the one-hot pulse shaper 1252 may be in other devices, such as the processor 1210, the CODEC 1234, the wireless controller 1240, and the display controller 1226.

In a particular embodiment, an input device 1230 and a power supply 1244 are coupled to the system-on-chip device 1222. Moreover, in a particular embodiment, as illustrated in FIG. 12, the display 1228, the input device 1230, the speaker 1236, the microphone 1238, the wireless antenna 1242, and the power supply 1244 are external to the system-on-chip device 1222. However, each of the display 1228, the input device 1230, the speaker 1236, the microphone 1238, the wireless antenna 1242, and the power supply 1244 can be coupled to a component of the system-on-chip device 1222, such as an interface or a controller.

Figure 13:
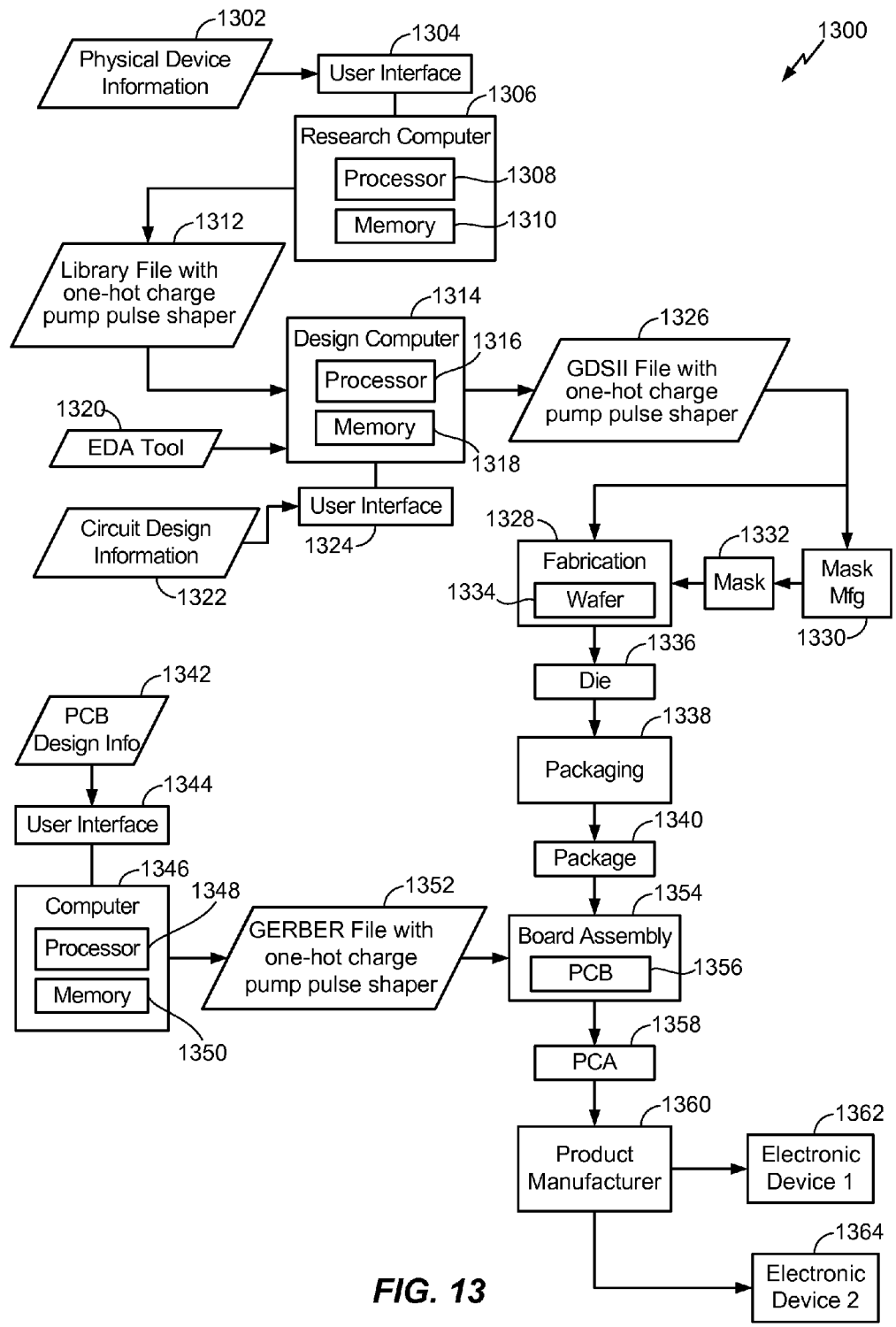
FIG. 13 is a data flow diagram illustrating a manufacturing process for use with a voltage boost circuit.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 13 depicts a particular illustrative embodiment of an electronic device manufacturing process 1300.

Physical device information 1302 is received in the manufacturing process 1300, such as at a research computer 1306. The physical device information 1302 may include design information representing at least one physical property of a semiconductor device, such as the voltage boost circuit of FIG. 1-4 or 9, the pulse shaper 300 of FIG. 3, the charge pump 400 of FIG. 4, or any combination thereof. For example the physical device information 1302 may include physical parameters, material characteristics, and structure information that is entered via a user interface 1304 coupled to the research computer 1306. The research computer 1306 includes a processor 1308, such as one or more processing cores, coupled to a computer readable medium such as a memory 1310. The memory 1310 may store computer readable instructions that are executable to cause the processor 1308 to transform the physical device information 1302 to comply with a file format and to generate a library file 1312.

In a particular embodiment, the library file 1312 includes at least one data file including transformed design information. For example, the library file 1312 may include a library of semiconductor devices including the voltage boost circuit of FIG. 1-4 or 9, the pulse shaper 300 of FIG. 3, the charge pump 400 of FIG. 4, or any combination thereof, that is provided for use with an electronic design automation (EDA) tool 1320.

The library file 1312 may be used in conjunction with the EDA tool 1320 at a design computer 1314 including a processor 1316, such as one or more processing cores, coupled to a memory 1318. The EDA tool 1320 may be stored as processor executable instructions at the memory 1318 to enable a user of the design computer 1314 to design a circuit using the voltage boost circuit of FIG. 1-4 or 9, the pulse shaper 300 of FIG. 3, the charge pump 400 of FIG. 4, or any combination thereof, of the library file 1312. For example, a user of the design computer 1314 may enter circuit design information 1322 via a user interface 1324 coupled to the design computer 1314. The circuit design information 1322 may include design information representing at least one physical property of a semiconductor device, such as the voltage boost circuit of FIG. 1-4 or 9, the pulse shaper 300 of FIG. 3, the charge pump 400 of FIG. 4, or any combination thereof. To illustrate, the circuit design information may include identification of particular circuits and relationships to other elements in a circuit design, positioning information, feature size information, interconnection information, or other information representing a physical property of a semiconductor device.

The design computer 1314 may be configured to transform the design information, including the circuit design information 1322 to comply with a file format. To illustrate, file formation may include a database binary file format representing planar geometric shapes, text labels, and other information about a circuit layout in a hierarchical format, such as a Graphic Data System (GDSII) file format. The design computer 1314 may be configured to generate a data file including the transformed design information, such as a GDSII file 1326 that includes information describing the voltage boost circuit of FIG. 1-4 or 9, the pulse shaper 300 of FIG. 3, the charge pump 400 of FIG. 4, or any combination thereof, in addition to other circuits or information. To illustrate, the data file may include information corresponding to a system-on-chip (SOC) that includes the pulse shaper 300 of FIG. 3 and that also includes additional electronic circuits and components within the SOC.

The GDSII file 1326 may be received at a fabrication process 1328 to manufacture the voltage boost circuit of FIG. 1-4 or 9, the pulse shaper 300 of FIG. 3, the charge pump 400 of FIG. 4, or any combination thereof, according to transformed information in the GDSII file 1326. For example, a device manufacture process may include providing the GDSII file 1326 to a mask manufacturer 1330 to create one or more masks, such as masks to be used for photolithography processing, illustrated as a representative mask 1332. The mask 1332 may be used during the fabrication process to generate one or more wafers 1334, which may be tested and separated into dies, such as a representative die 1336. The die 1336 includes a circuit such as the voltage boost circuit of FIG. 1-4 or 9, the pulse shaper 300 of FIG. 3, the charge pump 400 of FIG. 4, or any combination thereof.

The die 1336 may be provided to a packaging process 1338 where the die 1336 is incorporated into a representative package 1340. For example, the package 1340 may include the single die 1336 or multiple dies, such as a system-in-package (SiP) arrangement. The package 1340 may be configured to conform to one or more standards or specifications, such as Joint Electron Device Engineering Council (JEDEC) standards.

Information regarding the package 1340 may be distributed to various product designers, such as via a component library stored at a computer 1346. The computer 1346 may include a processor 1348, such as one or more processing cores, coupled to a memory 1350. A printed circuit board (PCB) tool may be stored as processor executable instructions at the memory 1350 to process PCB design information 1342 received from a user of the computer 1346 via a user interface 1344. The PCB design information 1342 may include physical positioning information of a packaged semiconductor device on a circuit board, the packaged semiconductor device corresponding to the package 1340 including the voltage boost circuit of FIG. 1-4 or 9, the pulse shaper 300 of FIG. 3, the charge pump 400 of FIG. 4, or any combination thereof.

The computer 1346 may be configured to transform the PCB design information 1342 to generate a data file, such as a GERBER file 1352 with data that includes physical positioning information of a packaged semiconductor device on a circuit board, as well as layout of electrical connections such as traces and vias, where the packaged semiconductor device corresponds to the package 1340 including the voltage boost circuit of FIG. 1-4 or 9, the pulse shaper 300 of FIG. 3, the charge pump 400 of FIG. 4, or any combination thereof. In other embodiments, the data file generated by the transformed PCB design information may have a format other than a GERBER format.

The GERBER file 1352 may be received at a board assembly process 1354 and used to create PCBs, such as a representative PCB 1356, manufactured in accordance with the design information stored within the GERBER file 1352. For example, the GERBER file 1352 may be uploaded to one or more machines for performing various steps of a PCB production process. The PCB 1356 may be populated with electronic components including the package 1340 to form a represented printed circuit assembly (PCA) 1358.

The PCA 1358 may be received at a product manufacture process 1360 and integrated into one or more electronic devices, such as a first representative electronic device 1362 and a second representative electronic device 1364. As an illustrative, non-limiting example, the first representative electronic device 1362, the second representative electronic device 1364, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 1362 and 1364 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-4, and 9 may illustrate remote units according to the teachings of the disclosure, the disclosure is not limited to these exemplary illustrated units. Embodiments of the disclosure may be suitably employed in any device that includes active integrated circuitry including memory and on-chip circuitry.

Thus, the voltage boost circuit of FIG. 1-4 or 9, the pulse shaper 300 of FIG. 3, the charge pump 400 of FIG. 4, or any combination thereof, may be fabricated, processed, and incorporated into an electronic device, as described in the illustrative process 1300. One or more aspects of the embodiments disclosed with respect to FIGS. 1-4, 9 and 10-11 may be included at various processing stages, such as within the library file 1312, the GDSII file 1326, and the GERBER file 1352, as well as stored at the memory 1310 of the research computer 1306, the memory 1318 of the design computer 1314, the memory 1350 of the computer 1346, the memory of one or more other computers or processors (not shown) used at the various stages, such as at the board assembly process 1354, and also incorporated into one or more other physical embodiments such as the mask 1332, the die 1336, the package 1340, the PCA 1358, other products such as prototype circuits or devices (not shown), or any combination thereof. Although various representative stages of production from a physical device design to a final product are depicted, in other embodiments fewer stages may be used or additional stages may be included. Similarly, the process 1300 may be performed by a single entity, or by one or more entities performing various stages of the process 1300.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
providing a first clock signal to a first charge pump unit of a charge pump;
providing a second clock signal to a second charge pump unit of the charge pump; and
providing a third clock signal to a third charge pump unit of the charge pump, wherein a low-to-high transition of the second clock signal occurs substantially concurrently with a high-to-low transition of the third clock signal, wherein a low-to-high transition of the first clock signal occurs substantially concurrently with a high-to-low transition of the second clock signal, wherein only one of the first clock signal, the second clock signal, and the third clock signal may be at a logic high voltage level at any given time.

2. The method of claim 1, further comprising:
receiving an enable signal to provide the first clock signal, the second clock signal, and the third clock signal to the charge pump, wherein each transition of each clock signal after a first transition of the first clock signal received at the charge pump occurs substantially concurrently with another transition of another clock signal received at the charge pump until a disable signal is received.

3. The method of claim 2, wherein at least two charge pump units are activated concurrently in response to each transition after the first transition.

4. The method of claim 1, further comprising:
receiving a disable signal to disable the first clock signal, the second clock signal, and the third clock signal to the charge pump, wherein a single falling edge transition is provided to the charge pump as a result of receiving the disable signal.

5. The method of claim 1, wherein the first charge pump unit includes a first capacitor coupled to an output of the charge pump, the first capacitor configured to at least partially discharge to the output in response to the low-to-high transition of the first clock signal, wherein the second charge pump unit includes a second capacitor coupled to the output of the charge pump, the second capacitor configured to at least partially discharge to the output in response to the high-to-low transition of the second clock signal.

6. The method of claim 5, wherein the first charge pump unit includes a third capacitor coupled to the output of the charge pump, the third capacitor configured to at least partially discharge to the output in response to a high-to-low transition of the first clock signal, wherein the second charge pump unit includes a fourth capacitor coupled to the output of the charge pump, the fourth capacitor configured to at least partially discharge to the output in response to the low-to-high transition of the second clock signal.

7. The method of claim 1, further comprising:
receiving a first input clock signal having a first phase, a second input clock signal having a second phase different from the first phase, and a third input clock signal having a third phase different from the first phase and the second phase;
generating the first clock signal based on the first input clock signal;
generating the second clock signal based on the second input clock signal; and
generating the third clock signal based on the third input clock signal.

8. The method of claim 7, wherein a first period of the first clock signal is approximately half of a period of the first input clock signal.

9. The method of claim 1, wherein providing the first clock signal to the first charge pump unit, providing the second clock signal to the second charge pump unit, and providing the third clock signal to the third charge pump unit are performed at a processor integrated into an electronic device.

10. The method of claim 1, wherein providing the first clock signal to the first charge pump unit, providing the second clock signal to the second charge pump unit, and providing the third clock signal to the third charge pump unit are performed at a power management integrated circuit.

11. The method of claim 1, wherein providing the first clock signal to the first charge pump unit, providing the second clock signal to the second charge pump unit, and providing the third clock signal to the third charge pump unit are performed by a pulse shaper.

12. The method of claim 1, further comprising:
providing a fourth clock signal to a fourth charge pump unit of a second charge pump;
providing a fifth clock signal to a fifth charge pump unit of the second charge pump; and
providing a sixth clock signal to a sixth charge pump unit of the second charge pump, wherein only one of the fourth clock signal, the fifth clock signal, and the sixth clock signal is at a logic high voltage level at any given time.

13. A method comprising:
receiving a first input clock signal having a first phase and a second input clock signal having a second phase different from the first phase;
generating a first clock signal based on the first input clock signal;
generating a second clock signal based on the second input clock signal; and
providing a one-hot input clock signal to a charge pump having multiple charge pump units, wherein the one-hot input clock signal includes multiple clock signals comprising the first clock signal provided to a first charge pump unit of the multiple charge pump units and the second clock signal provided to a second charge pump unit of the multiple charge pump units, wherein each transition of the multiple clock signals results in at most one of the multiple clock signals having a logic high voltage level.

14. The method of claim 13, wherein the one-hot input clock signal further comprises a third clock signal provided to a third charge pump unit of the multiple charge pump units.

15. The method of claim 13, further comprising:
receiving an enable signal to provide the first clock signal to the first charge pump unit and the second clock signal to the second charge pump unit, wherein each transition of the first clock signal after a first transition of the first clock signal occurs substantially concurrently with each transition of the second clock signal.

16. The method of claim 15, wherein each transition of the first clock signal activates the first charge pump unit and each transition of the second clock signal activates the second charge pump unit.

17. The method of claim 13, further comprising:
receiving a disable signal to disable the one-hot clock signal, wherein a single falling edge transition is provided to the charge pump as a result of receiving the disable signal.

18. The method of claim 13, wherein providing a one-hot input clock signal is performed by a processor integrated into an electronic device.

19. An apparatus comprising:
logic circuitry configured to receive a multiphase clock output signal of a ring oscillator and to generate multiple input clock signals to drive a charge pump having multiple charge pump units, wherein the multiple input clock signals are configured such that each transition of each input clock signal occurs substantially concurrently with another transition of another input clock signal of the multiple input clock signals.

20. The apparatus of claim 19, wherein only one input clock signal of the multiple input clock signals may be a logic high voltage level at any given time.

21. The apparatus of claim 19, wherein a first charge pump unit of the multiple charge pump units includes a first capacitor at a first clock signal input and a second capacitor at an inverted first clock signal input.

22. The apparatus of claim 19, wherein a first charge pump unit of the multiple charge pump units includes a first capacitor coupled to an output of the charge pump, the first capacitor configured to at least partially discharge to the output in response to a low-to-high transition of a first clock signal of the multiple clock signals at a first time, wherein a second charge pump unit includes a second capacitor coupled to the output of the charge pump, the second capacitor configured to at least partially discharge to the output in response to a high-to-low transition of a second clock signal at the first time.

23. The apparatus of claim 22, wherein the first charge pump unit includes a third capacitor coupled to the output of the charge pump, the third capacitor configured to at least partially discharge to the output in response to a high-to-low transition of the first clock signal at a second time, wherein the second charge pump unit includes a fourth capacitor coupled to the output of the charge pump, the fourth capacitor configured to at least partially discharge to the output in response to a low-to-high transition of the second clock signal at the second time.

24. The apparatus of claim 19, wherein a first period of a first input clock signal of the multiple input clock signals is approximately half of a period of a first clock output signal of the multiphase clock output signal.

25. The apparatus of claim 19, wherein the multiple input clock signals are generated by a processor integrated in a semiconductor device.

26. The apparatus of claim 19 integrated in a memory device.

27. The apparatus of claim 19 integrated in a mobile handset.

28. The apparatus of claim 19 integrated in a power management integrated circuit.

29. The apparatus of claim 19 integrated in at least one semiconductor die.

30. The apparatus of claim 19, further comprising a device selected from the group consisting of a set top box, a music player, a video player, an entertainment unit, a navigation device, a communications device, a personal digital assistant (PDA), a fixed location data unit, and a computer, into which the logic circuitry is integrated.

31. A computer readable tangible medium storing instructions executable by a computer, the instructions comprising:
    instructions that are executable by the computer to receive an enable signal to provide a first clock signal and a second clock signal to a charge pump, wherein each transition of each clock signal after a first transition of the first clock signal received at the charge pump occurs substantially concurrently with another transition of another clock signal received at the charge pump; and
    instructions that are executable by the computer to receive a disable signal to disable the first clock signal and the second clock signal to the charge pump, wherein a single falling edge transition is provided to the charge pump as a result of receiving the disable signal, wherein only one clock signal may be a logic high voltage level at any given time.

32. The computer readable tangible medium of claim 31, wherein the instructions are executable by a processor integrated in a device selected from the group consisting of a set top box, a music player, a video player, an entertainment unit, a navigation device, a communications device, a personal digital assistant (PDA), a fixed location data unit, and a computer.

33. A method comprising:
    a first step for providing a first clock signal to a first charge pump unit of a charge pump; and
    a second step for providing a second clock signal to a second charge pump unit of the charge pump, wherein:
        a low-to-high transition of the first clock signal occurs substantially concurrently with a high-to-low transition of the second clock signal; and
        the first step and the second step are performed by a processor integrated into an electronic device.

34. The method of claim 33, further comprising:
    a third step for providing a third clock signal to a third charge pump unit of the charge pump, wherein a low-to-high transition of the second clock signal occurs substantially concurrently with a high-to-low transition of the third clock signal.

35. An apparatus comprising:
    means for receiving a multiphase clock output signal of a ring oscillator; and
    means for generating multiple input clock signals to drive a charge pump having multiple charge pump units,
    wherein the multiple input clock signals are configured such that each transition of each input clock signal occurs substantially concurrently with another transition of another input clock signal of the multiple input clock signals.

36. The apparatus of claim 35 integrated in at least one semiconductor die.

37. The apparatus of claim 35, further comprising a device selected from the group consisting of a set top box, a music player, a video player, an entertainment unit, a navigation device, a communications device, a personal digital assistant (PDA), a fixed location data unit, and a computer, into which the means for receiving is integrated.

38. The apparatus of claim 35, wherein only one input clock signal of the multiple input clock signals is permitted to be at a logic high voltage level at any given time.

39. A method comprising:
    receiving design information representing at least one physical property of a semiconductor device, the semiconductor device comprising:
        logic circuitry configured to receive a multiphase clock output signal of a ring oscillator and to generate multiple input clock signals to drive a charge pump having multiple charge pump units, wherein the multiple input clock signals are configured such that each transition of each input clock signal occurs substantially concurrently with another transition of another input clock signal of the multiple input clock signals;
    transforming the design information to comply with a file format; and
    generating a data file including the transformed design information.

40. The method of claim 39, wherein the data file includes a GDSII format.

41. A method comprising:
    receiving a data file comprising design information corresponding to a semiconductor device; and
    fabricating the semiconductor device according to the design information, wherein the semiconductor device comprises:
        logic circuitry configured to receive a multiphase clock output signal of a ring oscillator and to generate multiple input clock signals to drive a charge pump having multiple charge pump units, wherein the multiple input clock signals are configured such that each transition of each input clock signal occurs substantially concurrently with another transition of another input clock signal of the multiple input clock signals.

42. The method of claim 41, wherein the data file has a GDSII format.

43. A method comprising:

receiving design information comprising physical positioning information of a packaged semiconductor device on a circuit board, the packaged semiconductor device comprising:

logic circuitry configured to receive a multiphase clock output signal of a ring oscillator and to generate multiple input clock signals to drive a charge pump having multiple charge pump units, wherein the multiple input clock signals are configured such that each transition of each input clock signal occurs substantially concurrently with another transition of another input clock signal of the multiple input clock signals; and transforming the design information to generate a data file.

44. The method of claim 43, wherein the data file has a GERBER format.

\* \* \* \* \*